United States Patent
Uchida

(10) Patent No.: US 7,428,225 B2
(45) Date of Patent: Sep. 23, 2008

(54) WIRELESS COMMUNICATION SYSTEM AND WIRELESS COMMUNICATION METHOD

(75) Inventor: Minoru Uchida, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 663 days.

(21) Appl. No.: 11/058,459

(22) Filed: Feb. 16, 2005

(65) Prior Publication Data

US 2005/0220050 A1    Oct. 6, 2005

(30) Foreign Application Priority Data

Feb. 19, 2004    (JP)    ............... 2004-042525

(51) Int. Cl.
*H04Q 7/00* (2006.01)

(52) U.S. Cl. ............ 370/329; 370/328; 370/345; 370/349; 455/450; 455/452.1; 455/519

(58) Field of Classification Search ......... 455/517–521, 455/509, 416, 426.1–426.2, 450–452.2; 370/329–330, 370/345, 349, 328
See application file for complete search history.

(56) References Cited

U.S. PATENT DOCUMENTS

| | | | | |
|---|---|---|---|---|
| 5,699,354 A | * | 12/1997 | Gulliford et al. ............. | 370/315 |
| 5,758,291 A | * | 5/1998 | Grube et al. ................ | 455/518 |
| 5,983,099 A | * | 11/1999 | Yao et al. .................. | 455/426.1 |
| 6,289,218 B1 | * | 9/2001 | Liu ........................... | 455/426.1 |
| 6,449,491 B1 | * | 9/2002 | Dailey ....................... | 455/518 |
| 6,477,150 B1 | | 11/2002 | Maggenti et al. | |
| 6,522,886 B1 | * | 2/2003 | Youngs et al. ............... | 455/450 |
| 6,542,750 B2 | * | 4/2003 | Hendrey et al. .......... | 455/456.1 |
| 6,600,928 B1 | * | 7/2003 | Ahya et al. ................. | 455/518 |
| 6,714,795 B1 | * | 3/2004 | Long et al. .................... | 455/518 |
| 6,735,430 B1 | * | 5/2004 | Farley et al. ............. | 455/414.1 |
| 6,895,254 B2 | * | 5/2005 | Dorenbosch ................ | 455/518 |

(Continued)

FOREIGN PATENT DOCUMENTS

JP    61118055    6/1986

(Continued)

OTHER PUBLICATIONS

U.S. Appl. No. 10/403,276, filed Apr. 1, 2003, Kanazawa et al.

(Continued)

*Primary Examiner*—Sharad Rampuria
(74) *Attorney, Agent, or Firm*—Mattingly, Stanger, Malur & Brundidge, P.C.

(57) ABSTRACT

A wireless communication system consisting of a base station and a plurality of mobile stations capable of conducting wireless communication with the base station. Each mobile station has a press button which accepts an order issued by an operator to execute a request for acquiring a transmission right, and a control section. The press button maintains depression electrically or mechanically. The control section in each of the mobile stations is adapted to execute a request for acquiring the transmission right, in response to acceptance of an order conducted by the press button. If the control section fails in acquiring the transmission right by executing the request, the control section is adapted to execute the request for acquiring the transmission right again.

11 Claims, 13 Drawing Sheets

U.S. PATENT DOCUMENTS

| | | | |
|---|---|---|---|
| 7,106,714 B2 * | 9/2006 | Spear et al. | 370/336 |
| 7,120,134 B2 * | 10/2006 | Tiedemann et al. | 370/329 |
| 7,126,928 B2 * | 10/2006 | Tiedemann et al. | 370/329 |
| 7,231,223 B2 * | 6/2007 | May et al. | 455/519 |
| 7,260,414 B2 * | 8/2007 | Hassan et al. | 455/518 |
| 7,343,163 B1 * | 3/2008 | Perkins et al. | 455/452.1 |
| 7,366,533 B2 * | 4/2008 | Biggs et al. | 455/509 |
| 2003/0012149 A1 | 1/2003 | Maggenti et al. | |
| 2007/0146802 A1 | 6/2007 | Ushida | |

FOREIGN PATENT DOCUMENTS

| | | |
|---|---|---|
| JP | 6253527 | 3/1987 |
| JP | 1268346 | 10/1989 |
| JP | 353724 | 3/1991 |
| JP | 2000350256 | 12/2000 |
| JP | 200116252 | 1/2001 |
| JP | 2003526276 | 9/2003 |
| WO | 0167675 A2 | 9/2001 |
| WO | 0241612 A2 | 5/2002 |

OTHER PUBLICATIONS

"Narrow Band Digital Telecommunication System (SCPC/FDMA)", ARIB STD-T61, May 27, 1999.

* cited by examiner

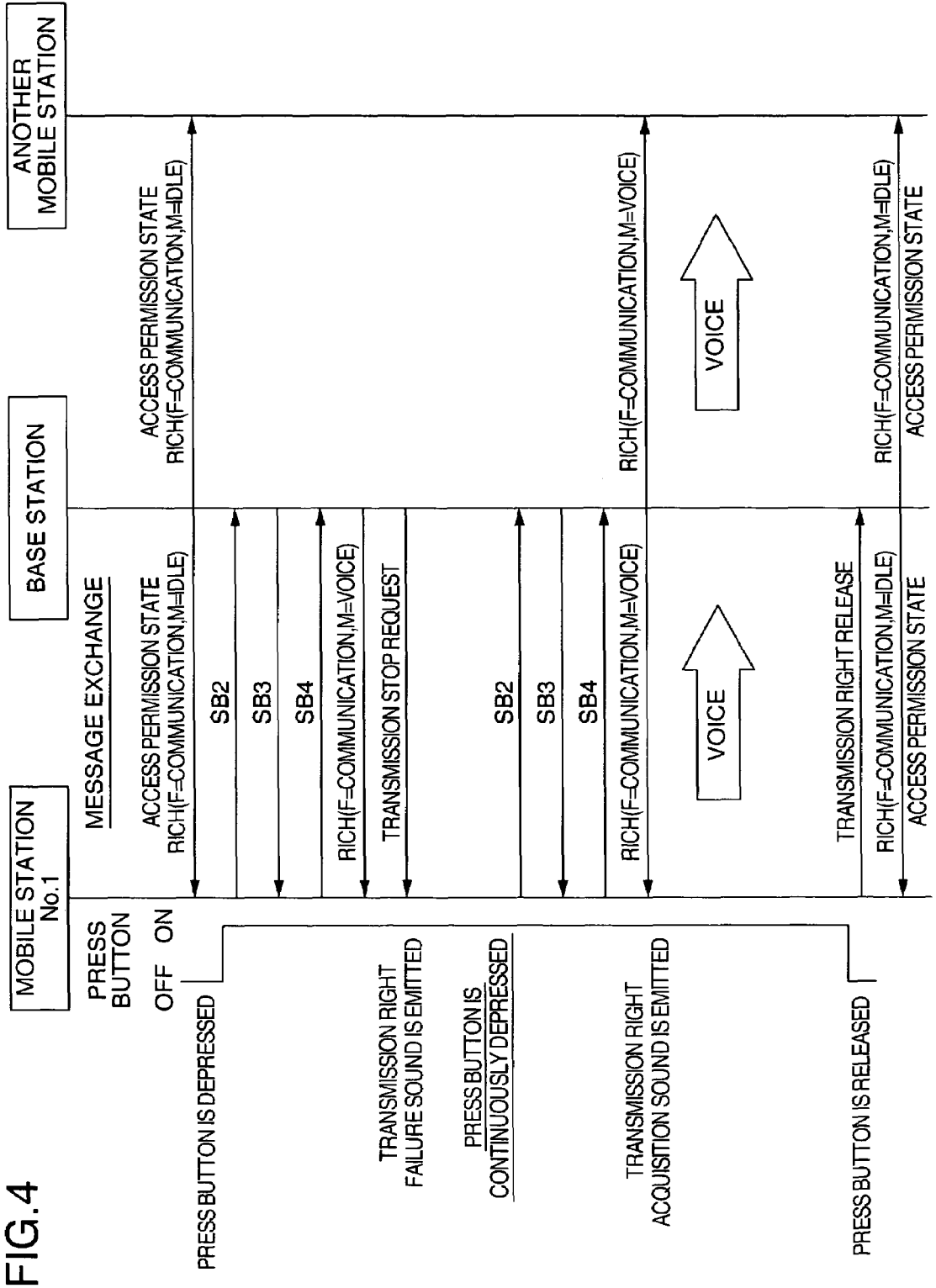

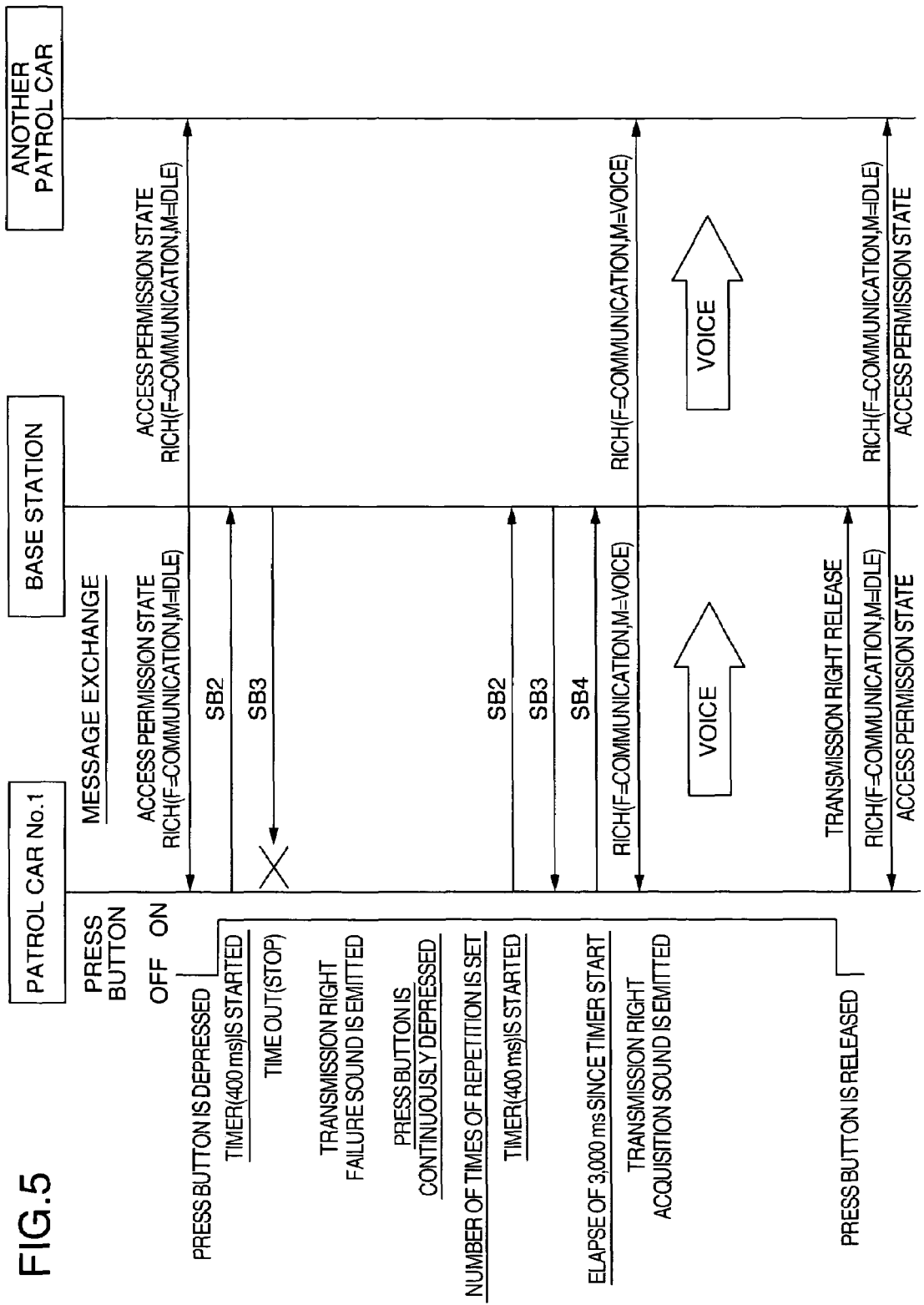

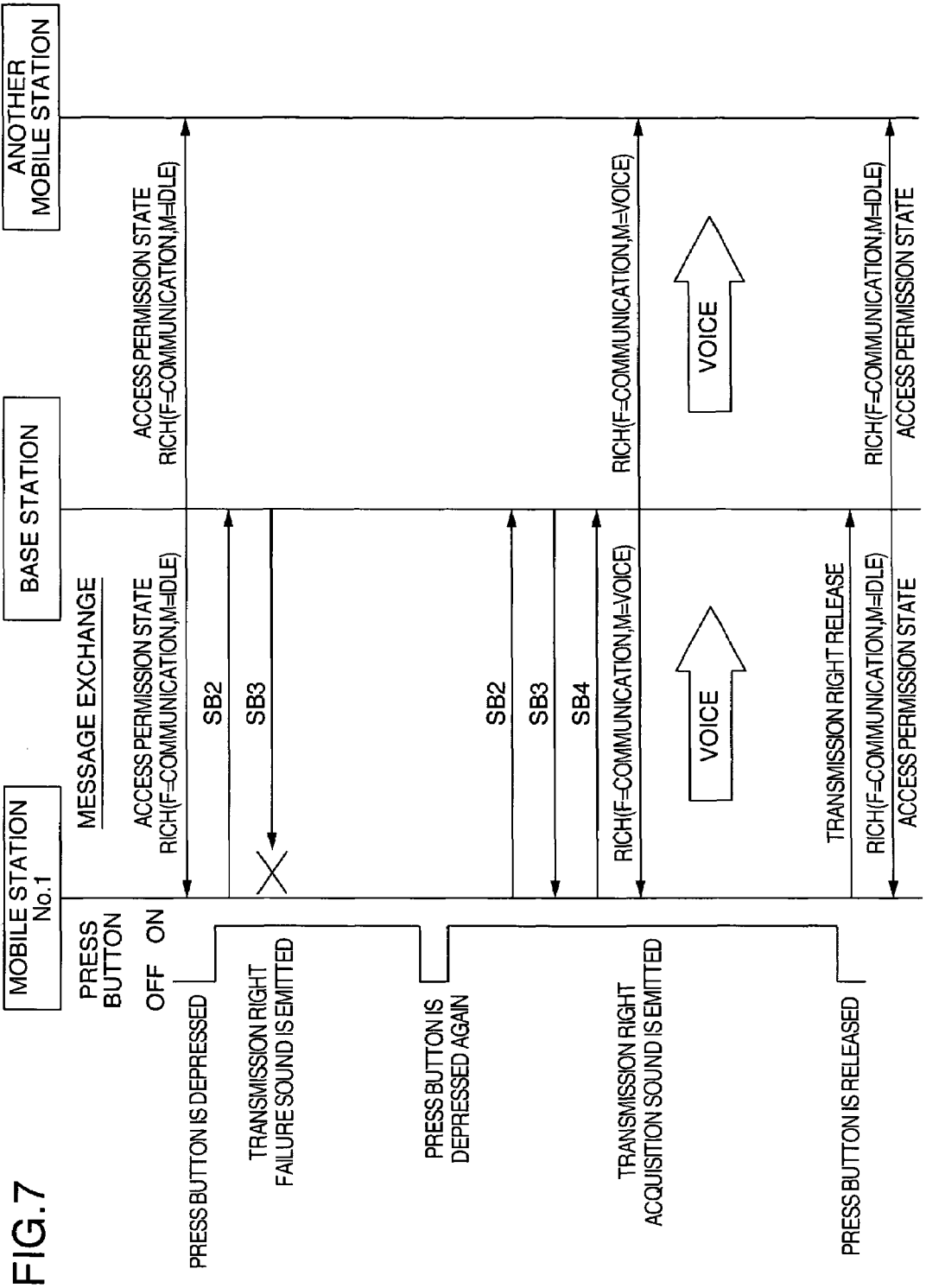

FIG.11

| UP-LINK/ DOWN-LINK | LP+R | Pa | TCH | RI | SW | UNDEFINED | TCH |
|---|---|---|---|---|---|---|---|
| | 30 | 2 | 96 | 56 | 20 | 20 | 160 |

LP+R : PREAMBLE FOR LINEARIZER AND GUARD TIME FOR BURST TRANSIENT RESPONSE
Pa : PREAMBLE
TCH : TRAFFIC CHANNEL
RI : RADIO INFORMATION CHANNEL(RICH)
SW : SYNCHRONOUS WORD

SIGNAL FORMAT OF COMMUNICATION CHANNEL

FIG.12

| UP-LINK/ DOWN-LINK | LP+R | Pb | RI | SW | Pb | PI | G |
|---|---|---|---|---|---|---|---|
| | 40 | 88 | 56 | 32 | 56 | 104 | 8 |

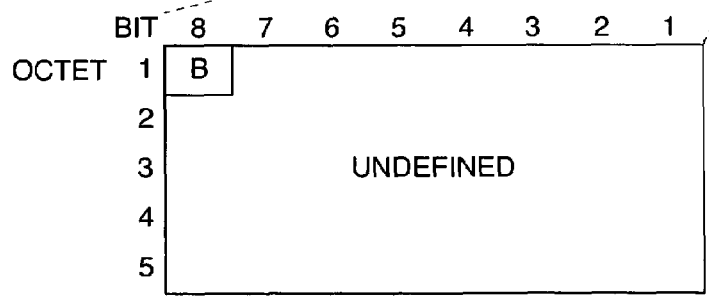

CONVOLUTION

LP+R : PREAMBLE FOR LINEARIZER AND GUARD TIME FOR BURST TRANSIENT RESPONSE
Pb : PREAMBLE
RI : RADIO INFORMATION CHANNEL(RICH)
SW : SYNCHRONOUS WORD
PI : PARAMETER INFORMATION CHANNEL(PICH)
B : BURST IDENTIFICATION BIT
G : GUARD TIME

SIGNAL FORMAT OF SYNCHRONIZATION BURST

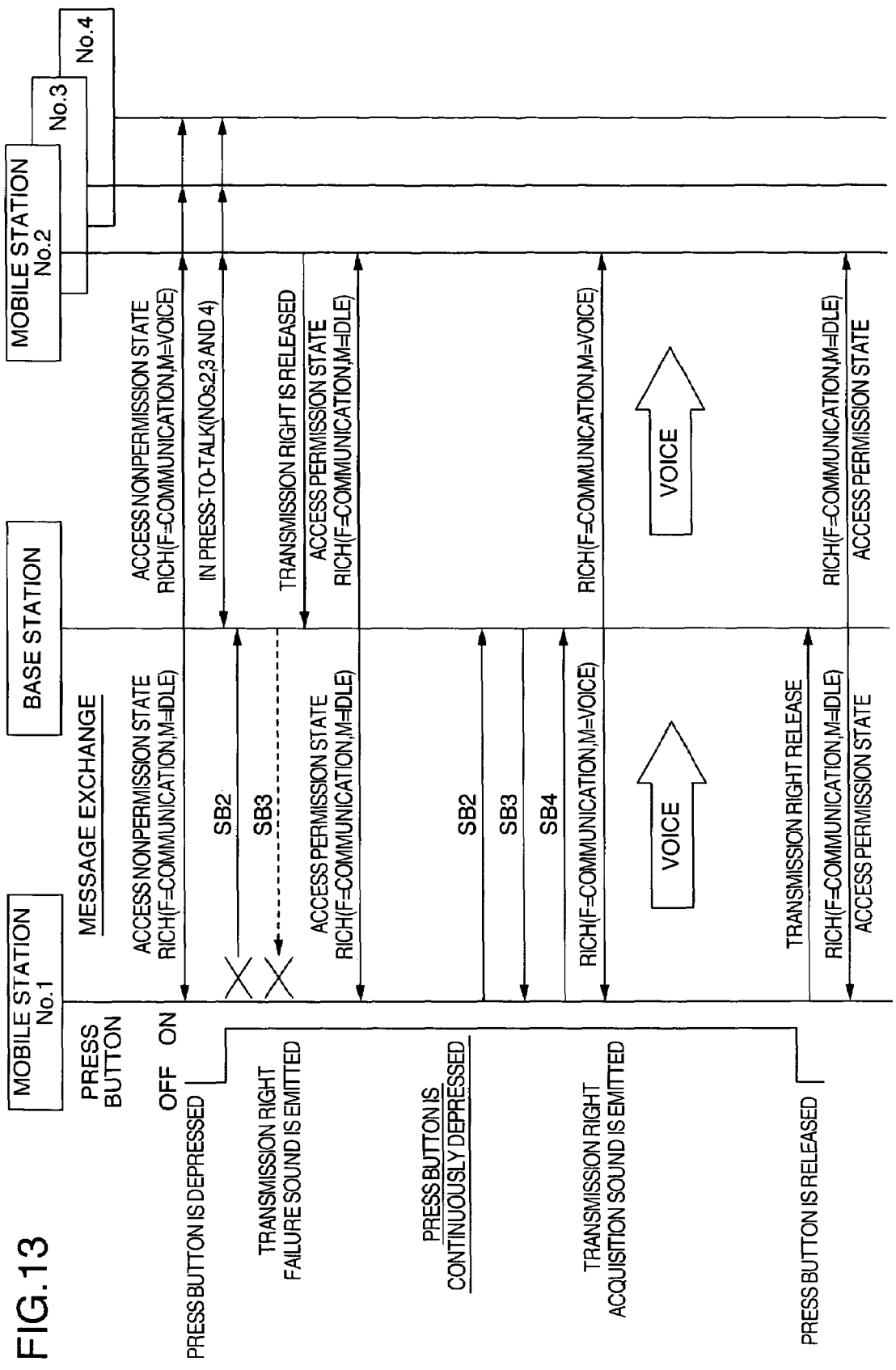

FIG.14
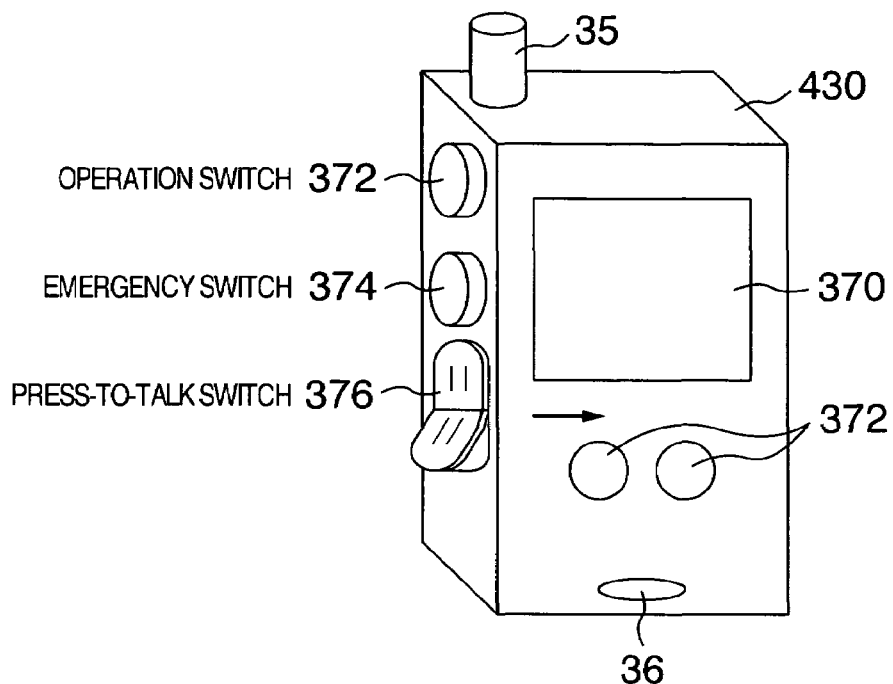
FIG.15
(a) 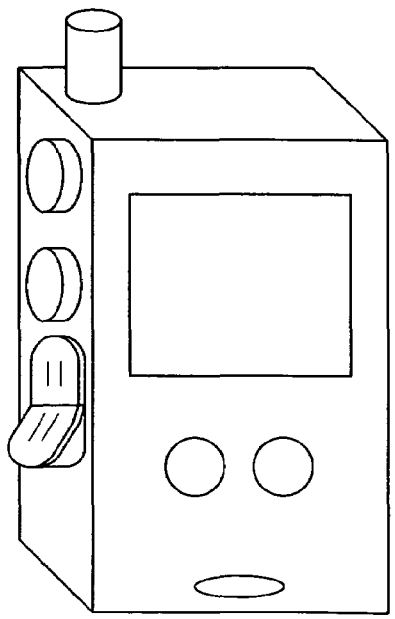     (b) 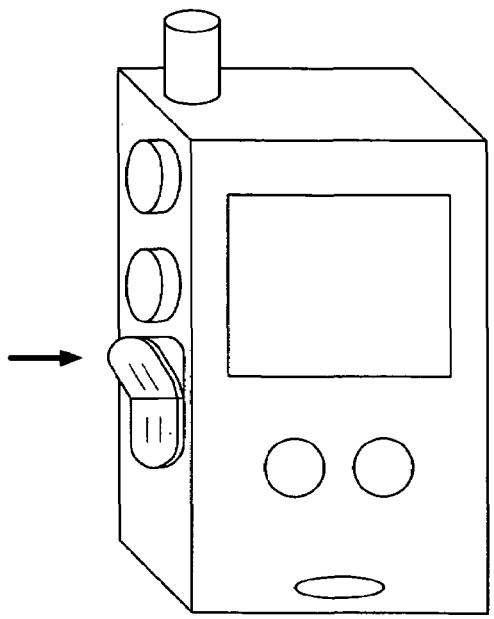

WIRELESS COMMUNICATION SYSTEM AND WIRELESS COMMUNICATION METHOD

INCORPORATION BY REFERENCE

The present application claims priority from Japanese application JP2004-042525 filed on Feb. 19, 2004, the content of which is hereby incorporated by reference into this application.

CROSS-REFERENCE TO RELATED APPLICATION

This application contains subject matter which is related to the subject matter of U.S. patent application Ser. No. 10/403,276, which is assigned to the same assignee as the present application, filed on Apr. 1, 2003 in the names of Masayuki Kanazawa and Masaru Adachi, and entitled "Mobile communication system having a base station and plural mobile stations and communication method therefore", the subject matter of which is hereby incorporated by reference herein in its entirety.

BACKGROUND OF THE INVENTION

The present invention relates to a wireless communication system in which a mobile station conducts wireless communication with a base station by using the simplex system. In particular, the present invention relates to a wireless communication system and a wireless communication method in which transmission right acquisition operation such as press button depressing operation (press operation) conducted by, for example, a user of a mobile station can be simplified.

For example, in a wireless communication system adopting the simplex system such as the press-to-talk system, the user depresses the press button when the mobile station is in the talkable state of the simplex system and operation for acquiring the transmission right (transmission right acquisition operation) is conducted. If the transmission right acquisition operation is conducted and message exchange with a higher rank apparatus can be conducted normally, the mobile station emits a sound for indicating the acquisition of the transmission right (transmission right acquisition sound) and passes into a state in which voice transmission is possible. On the other hand, when the message exchange with a higher rank apparatus cannot be conducted normally, or when acquisition of the transmission right is refused, the mobile station emits a sound for indicating a failure of the transmission right acquisition (transmission right acquisition failure sound) and passes into a state in which voice transmission is impossible. A base station or the like is used as the higher rank apparatus.

In the wireless system, the state of the air interface always changes due to the influence of whether the electric field is strong or weak, or whether the error rate is high or low, and the message exchange is not conducted normally in some cases. Furthermore, since the transmission right control is conducted in the higher rank apparatus, a refusal might be issued to a transmission right acquisition request from the mobile station for some reason.

A narrow band digital wireless communication system according to a FDMA (Frequency Division Multiple Access) system using the press-to-talk system is described in, for example, "Narrow Band Digital Telecommunication System (SCPC/FDMA)," ARIB STD-T61, published by Association of Radio Industries and Businesses, May 1999, pages 3, 5, 14, 16, 35, 36, 37 and 40.

With reference to FIGS. 7, 8 and 9, some typical conventional operation examples in wireless communication systems using the press-to-talk system will be described.

An example of press button operation in a mobile station and an example of a message exchange sequence between the mobile station and a base station which is a higher rank apparatus are shown in FIGS. 7, 8 and 9.

Specifically, a user of a mobile station No. 1 operates a press button, and the mobile station No. 1 acquires the transmission right via the base station which is a higher rank apparatus. Speech transmitted from the "mobile station No. 1" is transmitted to "another mobile station" via the "base station." A flow of processing conducted in this case is shown.

In the case shown in FIG. 7, message exchange with the higher rank apparatus is not conducted normally in the "mobile station No. 1" for, for example, the reason that the mobile station is in a region insensitive to the radio wave. After nonestablishment of synchronous burst exchange has thus occurred once, the transmission right acquisition request is issued again and the transmission right is acquired.

In the case shown in FIG. 8, a refusal to permit transmission right acquisition is sent from the higher rank apparatus to the "mobile station No. 1" once by using a radio information channel (M=idle), and then the "mobile station No. 1" issues a transmission right acquisition request again and acquires the transmission right.

In the case shown in FIG. 9, a refusal to permit preservation of the transmission right is sent from the higher rank apparatus to the "mobile station No. 1" once by using a transmission cease request, and then the "mobile station No. 1" issues a transmission right acquisition request again and acquires the transmission right.

When the message exchange with the higher rank apparatus is not conducted normally, the transmission right acquisition is refused, or the "mobile station No. 1" is made to stop the transmission as shown in FIGS. 7, 8 and 9, the user temporarily releases the press button and depresses the press button again. As a result, subsequent processing is started.

SUMMARY OF THE INVENTION

When the message exchange with the higher rank apparatus is not conducted normally, the transmission right acquisition is refused, or the "mobile station No. 1" is made to stop the transmission, the next transmission right acquisition operation cannot be conducted unless the user temporarily releases the press button and depresses the press button again, as described above. The mobile station in the conventional wireless communication system has such a problem, resulting in insufficient user convenience in use.

In view of such conventional circumstances, the present invention has been achieved. An object of the present invention is to provide a wireless communication system capable of simplifying the transmission right acquisition operation such as press button depressing operation conducted by the user of the mobile station.

In order to achieve the object, a wireless communication system according to one aspect of the present invention includes a base station and a plurality of mobile stations capable of conducting wireless communication with the base station by using a simplex system.

Each of the mobile stations includes an order accepting section to accept an order issued by an operator to execute a request for acquiring a transmission right, and a control section. The control section in each of the mobile stations is adapted to execute a request for acquiring the transmission right, in response to acceptance of an order in the order accepting section. If the control section fails in acquiring the transmission right by executing the request, the control section is adapted to execute the request for acquiring the transmission right again.

If a transmission right request is executed in response to an order of transmission right acquisition request execution and acquisition of the transmission right fails, the transmission right acquisition request is executed again in the mobile station. For example, therefore, the transmission right acquisition operation such as press button depressing operation conducted by the user of the mobile station can be simplified, resulting in improved user convenience in use.

As the order accepting section of the transmission right acquisition request execution, various configurations may be used. For example, a button, a key, a mouse or the like can be used.

Preferably, in the wireless communication system according to the present invention, the execution of the request for acquiring the transmission right in the control section in the mobile station includes conducting wireless transmission of a request signal (SB2) for acquiring the transmission right to the base station. Upon receiving the request signal from the mobile station, the base station is adapted to conduct wireless transmission of a transmission right giving signal (SB3) to the mobile station. Upon receiving the transmission right giving signal from the base station, the control section in the mobile station is adapted to conduct wireless transmission of a transmission right giving answer signal (SB4) to the base station. Upon receiving the transmission right giving answer signal, the base station is adapted to set a radio information channel (RICH) on a physical radio channel. And a status information output (providing) section in the mobile station provides the user with information of a transmission right acquisition status.

Therefore, the mobile station outputs, for example, information concerning an execution result of the transmission right acquisition request, such as information indicating whether the transmission right has been acquired or the acquisition of the transmission right has failed in response to a transmission right acquisition request and information indicating the number of times the transmission right acquisition request has been executed or the transmission right acquisition request can be executed thereafter. Accordingly, it is possible to inform the user or the like of effective information.

As the transmission right acquisition request signal, various signals may be used.

As the transmission right acquisition request answer signal, various signals may be used. For example, a signal for permitting the mobile station to acquire the transmission right, a signal for refusing the mobile station to acquire the transmission right, or a signal for prohibiting the mobile station to sustain the transmission right although the mobile station is once permitted to acquire the transmission right (i.e., a signal for canceling the permission of the transmission right) can be used.

As the information concerning the execution result of the request for acquiring the transmission right, various kinds of information may be used.

As the way of outputting the information concerning the execution result of the request for acquiring the transmission right, various ways may be used. For example, the way of displaying text or image information on the screen, the way of outputting voice information from a speaker, or the way of outputting information to another apparatus can be used.

Preferably, in the wireless communication system according to the present invention, the control section in the mobile station conducts wireless transmission of a transmission right request signal to the base station as execution of a request for acquiring the transmission right. If a signal permitting acquisition of the transmission right is not received from the base station within a predetermined time, the control section in the mobile station regards it as a failure in acquisition of the transmission right using the transmission right acquisition request signal, and conducts wireless transmission of the transmission right acquisition request signal to the base station again.

If the transmission right is not acquired, therefore, it is possible to repetitively execute the transmission right request in the mobile station each time a predetermined time elapses.

Here, various times may be used as the predetermined time.

Preferably, the control section in the mobile station conducts re-execution of the request for acquiring the transmission right up to a predetermined number of times at maximum, in response to an order issued once and accepted by the order accepting section of the transmission right acquisition request execution. If the transmission right is acquired on the way even if the predetermined number of times is not reached, the control section in the mobile station, for example, suspends subsequent execution of the transmission right acquisition request.

In the mobile station, therefore, the user's convenience in use can be improved by, for example, conducting re-execution of the transmission right acquisition request a predetermined number of times at maximum in response to an order issued once by the user's operation.

Here, as the predetermined number of times, various numbers of times may be used.

Preferably, in the mobile station according to the present invention, an order accepting section accepts an order to execute a request for acquiring the transmission right. The control section executes the request for acquiring the transmission right. If the control section fails in acquiring the transmission right by executing the request, the control section executes the request for acquiring the transmission right again.

When a transmission right acquisition request is executed in response to a transmission right acquisition request execution order and the acquisition of the transmission right has failed, therefore, the transmission right acquisition request is requested again. For example, therefore, the transmission right acquisition operation such as press button depressing operation conducted by the user of the mobile station can be simplified, resulting in improved user convenience in use.

Preferably, in the mobile station according to the present invention, the order accepting section of the transmission right acquisition request execution includes a first order accepting section and a second order accepting section. The first order accepting section accepts an order that specifies once request execution as an order of execution of a request issued by an operator to acquire the transmission right. The second order accepting section accepts an order that specifies continuous request execution as an order of execution of a request issued by the operator to acquire the transmission right.

If an order is accepted by the first order accepting section, the control section executes a request for acquiring the transmission right only once. If an order is accepted by the second order accepting section, the control section executes a request for acquiring the transmission right at least twice except when the transmission right is acquired by executing the request for acquiring the transmission right only once.

According to the kind of an order issued by, for example, a user, therefore, processing of executing the transmission right acquisition request only once, or processing of continuously re-executing the transmission right acquisition request in the case where the transmission right is not acquired by executing the transmission right request once is conducted. The user can arbitrarily select processing from these kinds of processing and order it, resulting in high convenience to the user.

Here, various sections may be used as the first order accepting section and the second order accepting section. For example, they may be constituted as one body, or they may be constituted as separate bodies.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing a procedure of processing in still another embodiment of the present invention;

FIG. 5 is a diagram showing a procedure of processing in a further embodiment of the present invention;

FIG. 7 is a diagram showing an example of a communication procedure according to the press-to-talk system;

FIG. 11 is a diagram showing a signal format of a communication channel in an FDMA (Frequency Division Multiple Access) narrow band digital mobile communication system according to ARIB STD-T61;

FIG. 12 is a diagram showing a signal format of a synchronous burst in an FDMA (Frequency Division Multiple Access) narrow band digital mobile communication system according to ARIB STD-T61;

FIG. 13 is a diagram showing a procedure of processing in a still further embodiment of the present invention;

FIG. 14 is an oblique view showing a structure of a mobile station in an embodiment of the present invention;

FIG. 15 is a diagram showing operation of a mobile station shown in FIG. 14.

DESCRIPTION OF THE EMBODIMENTS

Figure 1:
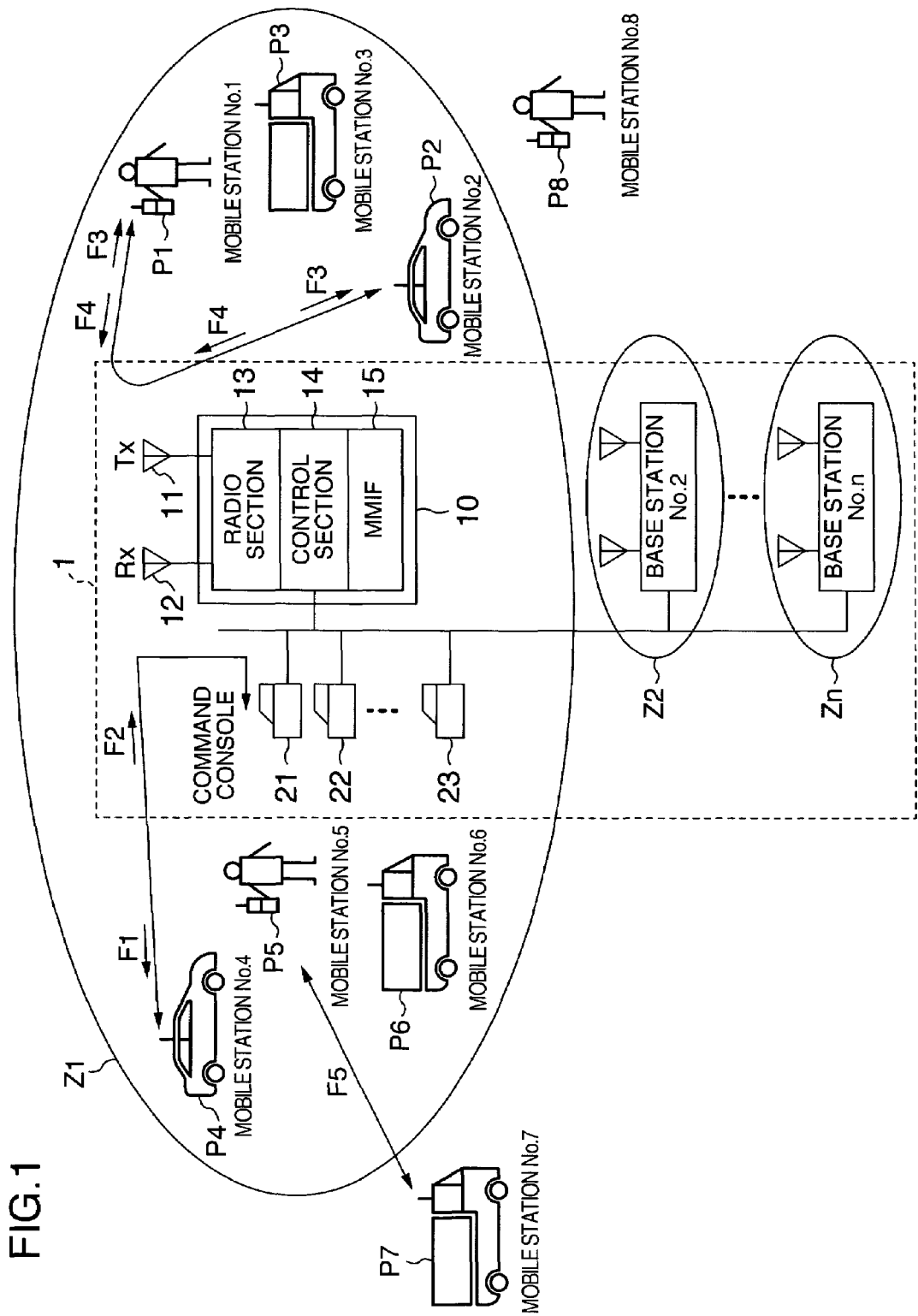
FIG. 1 is a diagram showing an embodiment of a wireless communication system according to the present invention.

Hereafter, embodiments of the present invention will be described with reference to the drawings. The same components are denoted by like reference numerals.

Ensuing embodiments show the case where the present invention is applied to an FDMA (Frequency Division Multiple Access) narrow band digital mobile communication system according to ARIB STD-T61 which is a wireless communication system.

FIG. 1 shows a configuration of a wireless communication system according to an embodiment of the present invention.

A wireless communication system according to the present embodiment includes a command console 21, a base station (No. 1) 10 connected to the command console 21 via a wire, and a plurality of mobile stations (mobile station No. 1 to mobile station No. 8) P1 to P8 subordinate to the base station 1.

In the example shown in FIG. 1, mobile stations (mobile stations No. 1 to No. 6) P1 to P6 which are present in a communication region (base station zone) Z1 of the base station 1 become communication subjects of the base station 1. Mobile stations (mobile stations No. 7 and No. 8) which are outside of the communication region Z1 of the base station 1 do not become communication subjects of the base station 1.

Furthermore, the wireless communication system according to the present embodiment may include a plurality of command consoles and base stations. For example, as shown in FIG. 1, the wireless communication system may further include command consoles 22 to 23 and base stations No. 2 to No. n connected to the command consoles 22 to 23, and these base stations may form base station zones Z2 to Zn. By the way, the command consoles are higher rank apparatuses of respective base stations, and the command consoles and base stations are connected by wire.

In the ensuing description, the base station (No. 1) 10 is taken as an example. The base station 10 includes a transmitting antenna 11 for transmitting a wireless signal, a receiving antenna 12 for receiving a wireless signal, a radio section 13 for conducting processing to perform wireless communication (transmission and reception), a control section 14 for exercising various kinds of control, and a man-machine interface section (hereafter referred to as MMIF) 15. The base station 10 is connected to the command console 21 through which a commander can issue various commands. The MMIF 15 includes a microphone/speaker section and an operation/display section as described later.

The base station 1 conducts for example, relay of communication conducted between two or more mobile stations P1 to P6, transmission of a command or the like accepted by the command consoles 21 to 23 to the mobile stations P1 to P6, transmission of an answer or the like from the mobile stations P1 to P6 to the command consoles 21 to 23, and execution of group communication using the press-to-talk system among two or more mobile stations P1 to P6. As an example, FIG. 1 shows the case where the mobile stations P1, P2 and P3 are conducting group communication via the base station 10 and the case where the mobile station P4 is conducting communication with the command console 21 via the base station 10. As for the communication among the mobile stations P1, P2 and P3, a carrier having a frequency F3 is used as a down-link carrier, and a carrier having a frequency F4 is used as an up-link carrier. As for the communication between the mobile station P4 and the command console 21, a carrier having a frequency F1 is used as a down-link carrier, and a carrier having a frequency F2 is used as an up-link carrier. As for each pair of a wireless up-link carrier and a wireless down-link carrier, carriers having frequencies related by an offset frequency Δf are selected from a predetermined up-link band (for example, 150 MHz band) and a predetermined down-link band (for example, 40 MHz band).

Each of the mobile stations P1 to P8 is formed as a portable apparatus which can be carried by a person (user) or as an apparatus installed on an automobile such as a taxi, a home delivery car, or a conveyance car.

By the way, the mobile station P7 and the mobile station P5 are communicating with each other by using a carrier F5 for direct communication in a mode in which communication is conducted by a press-to-talk system between a mobile station and another mobile station without intervention of a base station.

The present embodiment will now be described by taking the case where group communication (simplex group communication) according to the simplex system using the press-to-talk system is conducted as an example in the wireless communication system shown in FIG. 1.

It is now supposed that the mobile station (the mobile station No. 2) P2 and the mobile station (the mobile station No. 3) P3 are participating in talking in the release state of the press button when a user originates a call of simplex group communication by depressing a press button on the mobile station (mobile station No. 1) P1. When in this case message exchange with the base station 1 serving as a higher rank apparatus is conducted normally by depressing the press button on the mobile station P1, the mobile station P1 is brought to a transmittable state (transmission state) whereas other mobile stations P2 and P3 are brought to the reception state. If the press button on the mobile station P1 is released thereafter, press buttons are brought to the release state on all of the three mobile stations P1, P2 and P3 after message exchange with the base station 1 serving as the higher rank apparatus.

On the other hand, if the message exchange with the base station 1 serving as the higher rank apparatus is not conducted normally or it is refused when the press button on the mobile station P1 is depressed, the mobile station P1 is brought to a nontransmittible state. In the present embodiment, the mobile station P1 has a function of attempting the message exchange with the base station 1 serving as the higher rank apparatus again with the press button on the mobile station P1 maintained in, for example, the mechanically or electrically depressed state. If as a result the message exchange is conducted normally, the mobile station P1 is brought to the transmittable state.

Thus, in the configuration including at least one base station 1 in which the command consoles 21 to 23 are connected to the control section 14, and a plurality of mobile stations P1 to P8 which conduct wireless communication with the base station 1 to conduct digital wireless communication by using the press-to-talk system, the wireless communication system according to the present embodiment has a function of sending out a signal to request acquisition of transmission right in response to, for example, user's depression of the press button in an arbitrary one of the mobile stations P1 to P8, and a function of sending out the signal to request acquisition of the transmission right when the acquisition of the transmission right is not conducted for a predetermined time in the mobile station that is included in the mobile stations P1 to P8 and that has requested the acquisition of the transmission right.

In the wireless communication according to the present embodiment, a mobile station P1-P8 that has requested acquisition of the transmission right has a function of sending out a signal for requesting acquisition of the transmission right when the acquisition of the transmission right is not conducted for a predetermined time, a predetermined number of times until the mobile station receives a signal to the effect that the acquisition of the transmission right has been conducted, from the base station 1 serving as the higher rank apparatus.

The mobile station P1-P8 according to the present embodiment has a function of responding to reception of a signal to the effect that the transmission right has been acquired, from the base station 1 in response to a request of transmission right acquisition, by informing, for example, the user to that effect.

Although the mobile station P1-P8 requests acquisition of the transmission right, the mobile station might not be able to acquire the transmission right because, for example, the communication with the base station 1 is not conducted normally or the communication is refused by the base station 1. The mobile station P1-P8 has a function of informing, for example, the user to that effect in such a case.

When the base station 1 continues refusal of the transmission right acquisition, in some cases the base station periodically sends out a signal to the effect that acquisition of the transmission right is not permitted. The mobile station P1-P8 according to the present embodiment has a function of informing, for example, the user that the acquisition of the transmission right is not permitted, in response to reception of a signal to that effect.

In the mobile station P1-P8, different information contents are used depending upon whether the transmission right acquisition has been conducted or not.

In the wireless communication system according to the present example, therefore, the next transmission right acquisition operation can be conducted continuously in the mobile station P1-P8 with, for example, the press button remains to be depressed, resulting in convenience for the user's use. For example, when the mobile station P1-P8 is in the talking state of the simplex system in the digital wireless system, operation concerning the depression operation of the press button on the mobile station P1-P8 can be simplified.

As for the number of times of the transmission right acquisition operation repeated while maintaining the depressed state of the press button in response to depression of the press button on the mobile station P1-P8 conducted once, and an interval set between a certain transmission right acquisition operation and the next transmission right acquisition operation, it is desirable to set them equal to suitable values according to, for example, the use situation of the system.

In the present embodiment, the case where the transmission right control is conducted by the base station 1 serving as the higher rank apparatus has been shown. As the higher rank apparatus which controls the transmission right, not only the base station but also various apparatuses such as a command console may be used.

As the mobile stations P1 to P8, various machines such as portable machines, machines mounted on vehicles, portable machines, fixed machines and semi-fixed machines can be used.

The present invention may be applied to various wireless communication systems such as taxi wireless systems, house delivery wireless systems, remote observation wireless systems, in-plant wireless systems and train wireless systems. As an example, the present invention can be applied to a system in which communication is conducted between the command console 21-23 included in train wireless station command consoles and a mobile station P1-P8 installed at a driver's seat in a train vehicle.

Another embodiment will now be described with reference to FIG. 2.

Figure 2:
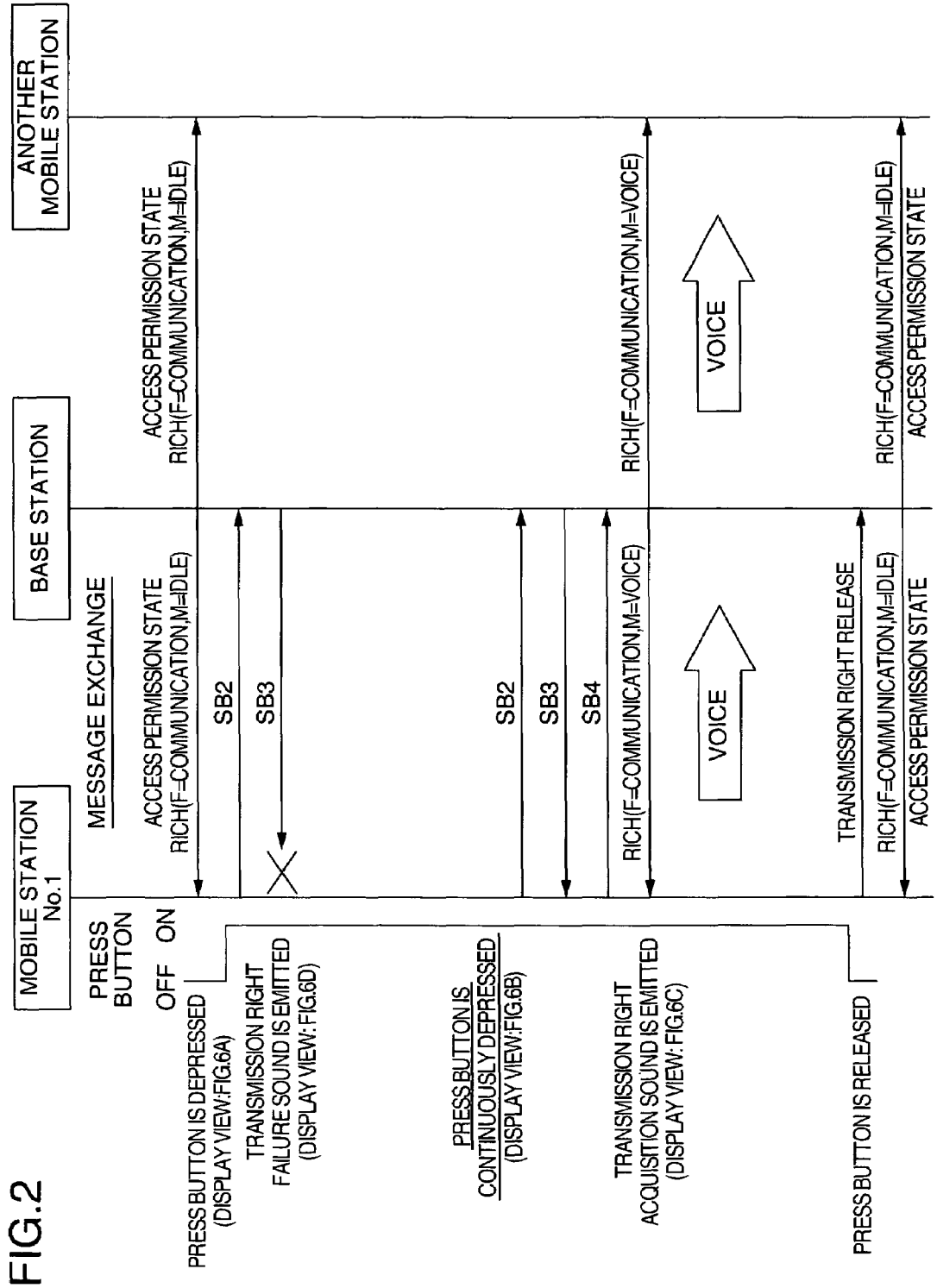
FIG. 2 is a diagram showing a procedure of processing in another embodiment of the present invention.

FIG. 2 shows an example of operation of the press button on the mobile station (mobile station No. 1) P1 and an example of a sequence of message exchange conducted between the mobile station P1 and the base station 1 serving as the higher rank apparatus.

The present example shows a process flow in the case where the user of the mobile station No. 1 operates the press button so that the mobile station No. 1 acquires the transmission right through the base station serving as the higher rank apparatus to the voice transmitted from the mobile station No. 1 is transmitted to another mobile station through the base station.

The present example shows the case where the mobile station No. 1 has failed to conduct message exchange with the base station serving as the higher rank apparatus and non-establishment of synchronous burst exchange occurs once and then a transmission right acquisition request is issued again and the transmission right is acquired.

By the way, "SBn" represents a burst signal for synchronization establishment (synchronous burst signal), where n is a numerical value of at least 1. "RICH" represents a signal of a radio information channel, and "F" represents a radio channel structure identification, whereas "M" represents a communication mode identification such as "idle" and "voice." "Transmission right release" represents a signal of a wireless management message (layer 3 signal).

Hereafter, the ARIB STD-T61 will be described briefly.

In the FDMA (Frequency Division Multiple Access) narrow band digital mobile communication system according to STD-61, a minimum communication unit on the radio carrier is called frame, and a radio channel is formed of a set of frames. A radio channel includes a communication channel and a synchronous burst differing in frame format. An outline of them is shown in TABLE 1.

TABLE 1

Definition of radio channel

| Radio channel name | Definition of radio channel |
|---|---|
| Communication channel (SC: Service Channel) | (1) See definition of SC below |
| Synchronous burst (SB0: Synchronous Burst 0) | (2) See definition of SB0 below |

(1) SC is a bidirectional channel to be used by the user for communication. The SC includes a traffic channel (TCH) and a radio information channel (RICH).

(2) SB0 is burst data exchanged before the TCH at the time of communication in an assigned radio channel.

Each radio channel includes various function channels as shown in TABLE 2.

TABLE 2

Configuration of physical radio channel

| Physical radio channel | Function channel |
|---|---|
| Communication channel (SC) | Traffic channel (TCH) |
| | Radio information channel (RICH) |
| Synchronous burst (SB0) | Parameter information channel (PICH) |
| | Radio information channel (RICH) |

The RICH (Radio Information Channel) is disposed on every physical radio channel, and used to transfer channel information such as the radio channel structure, operation mode and communication mode. As occasion demands, the PTSD is used to transfer user information as well.

The TCH (Traffic Channel) is used to transfer voice information or the like on a point-point or multipoint bidirectional channel provided to transfer user information.

The PICH (Parameter Information Channel) is a point-point or multipoint bidirectional channel. It refers to a function channel for transferring information unique to the user together with the synchronous burst.

Figure 10:
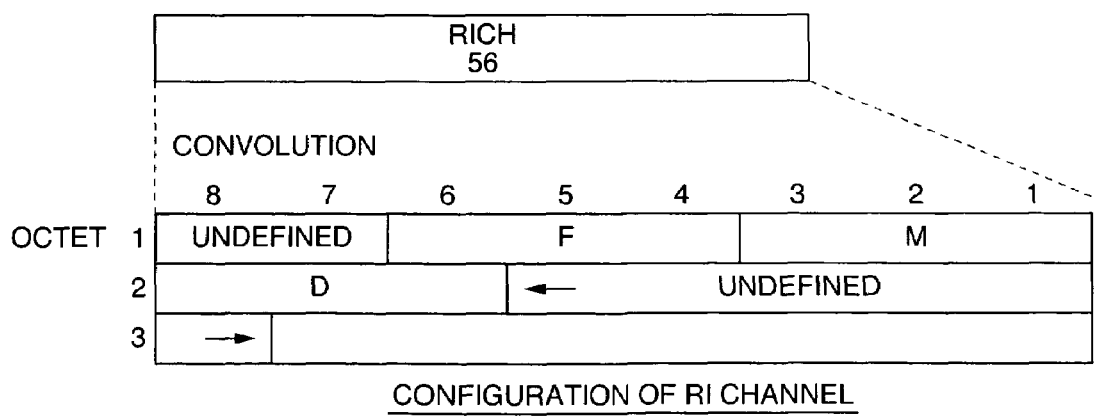
FIG. 10 is a diagram showing a configuration of an RICH (Radio Information Channel) in an FDMA (Frequency Division Multiple Access) narrow band digital mobile communication system according to ARIB STD-T61.
Figure 8:
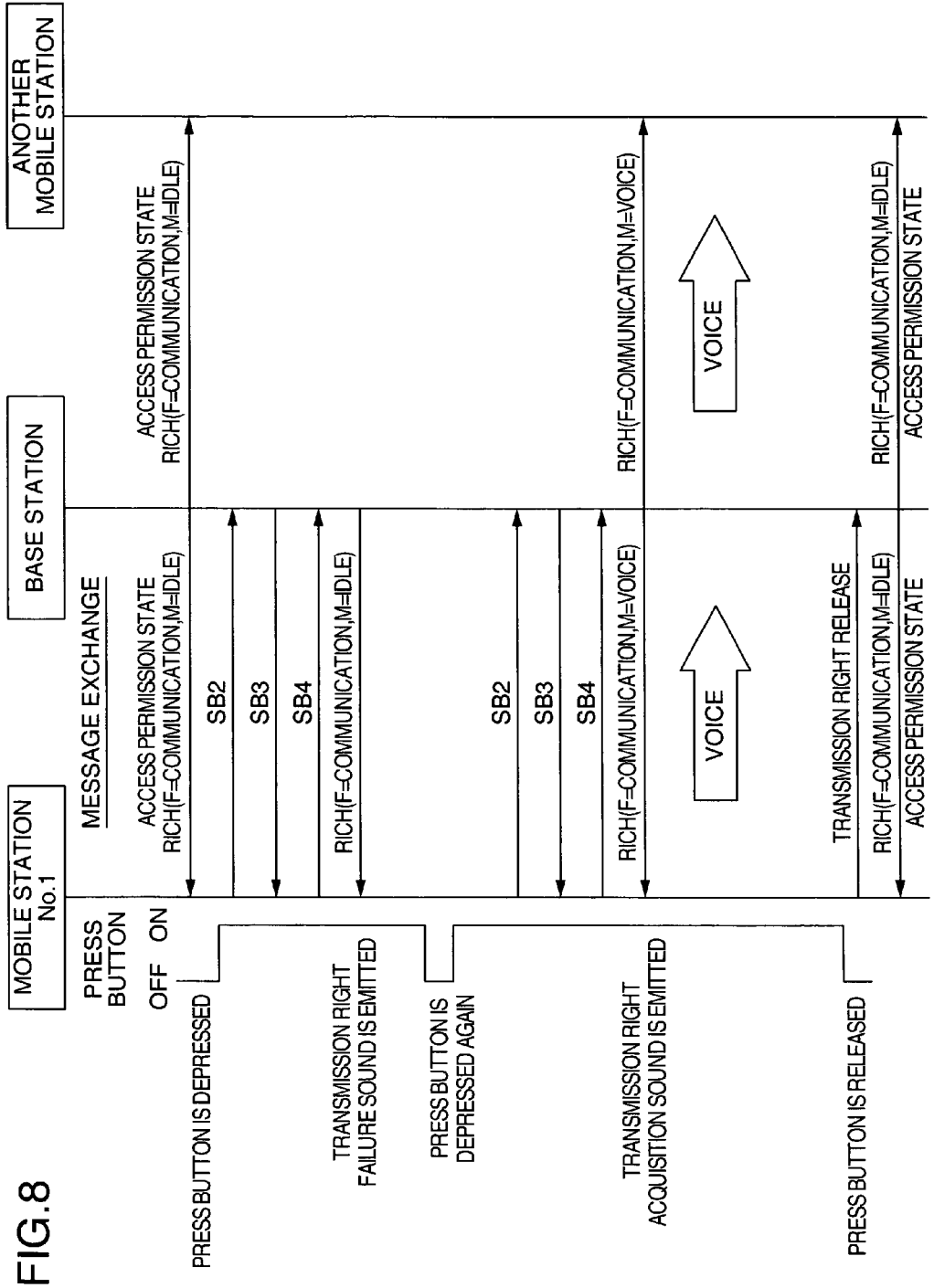
FIG. 8 is a diagram showing another example of a communication procedure according to the press-to-talk system.
Figure 9:
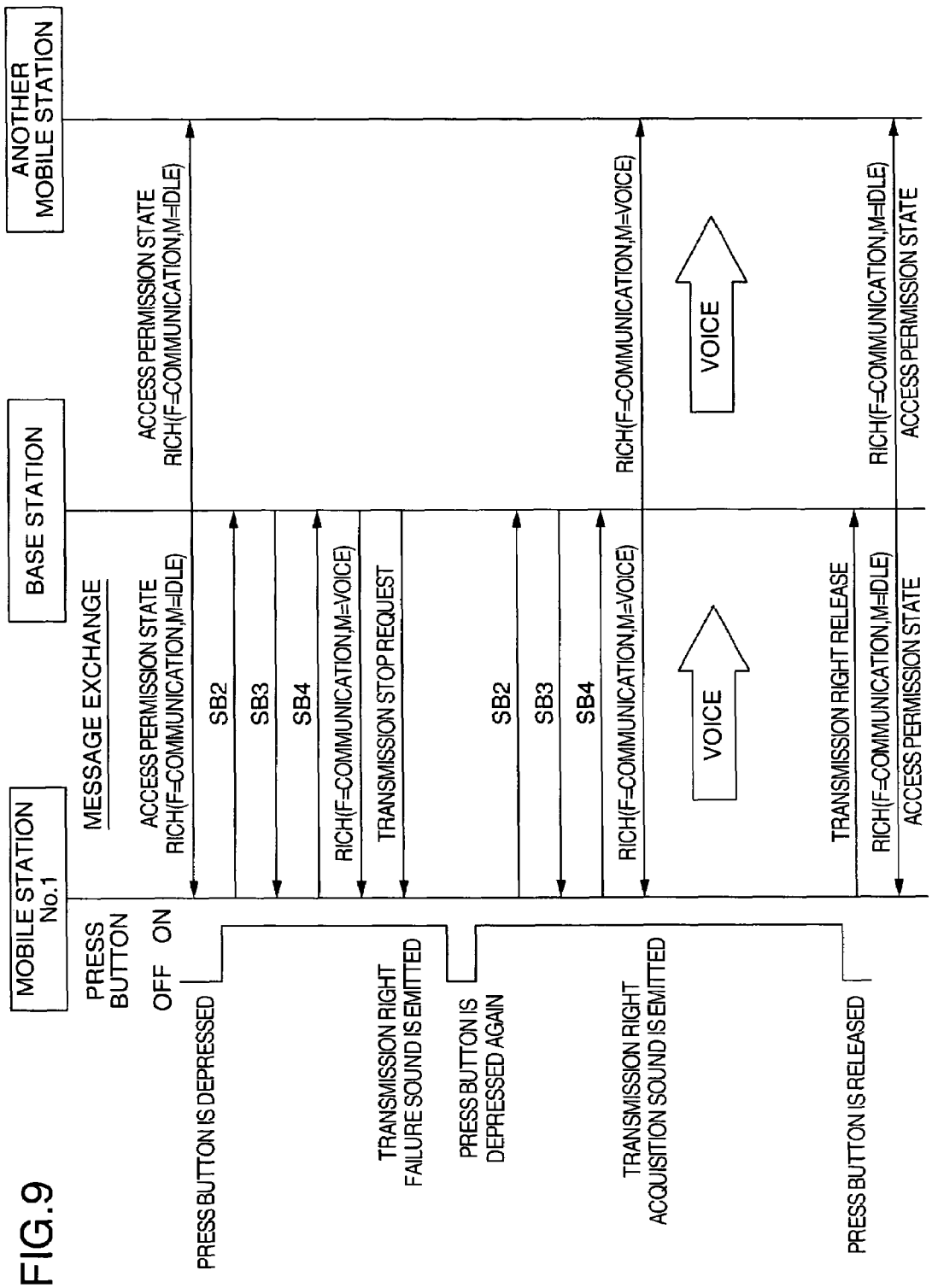
FIG. 9 is a diagram showing still another example of a communication procedure according to the press-to-talk system.

The radio channel structure identification (F), the communication mode identification (M), and operation mode identification (D) can be disposed on the RICH, and they are displayed as shown in FIG. 10. Contents of each information identification are shown in TABLES 3 to 5.

TABLE 3

Radio channel structure identification

| F | Radio channel structure identification |
|---|---|
| 000 | Undefined |
| 001 | Undefined |
| 010 | Undefined |
| 011 | Communication channel |
| 100 | Undefined |
| 101 | Undefined |
| 110 | Undefined |
| 111 | Synchronous burst |

TABLE 4

Communication mode identification

| M | Communication mode identification |
|---|---|
| 000 | Undefined |
| 001 | TCH: voice signal |
| 010 | Undefined |
| 011 | Undefined |
| 100 | Undefined |
| 101 | Idle line signal |
| 110 | BUSY (it indicates that a radio line between base station and mobile station is occupied |
| 111 | Undefined |

TABLE 5

Operation mode identification

| D | Operation mode identification |
|---|---|
| 000 | Communication via base station |
| 001 | Undefined |
| 010 | Undefined |
| 011 | Direct communication |
| 100 | Undefined |
| 101 | Undefined |
| 110 | Undefined |
| 111 | Undefined |

Signal format: The bit arrangement is configured to align the transmission position of frame synchronization.

Communication channel (SC): The signal format (bit arrangement) in the communication channel (384 bits) is shown in FIG. 11.

Synchronous burst (SB0): The synchronous burst (384 bits) is a signal transmitted to establish synchronization in the communication channel up-link/down-link. Its signal format (bit arrangement) is shown in FIG. 12.

Referring back to FIG. 2, the procedure of communication processing shown in FIG. 2 will now be described specifically.

First, it is now supposed that an access permission state is brought about by "RICH (F=communication, M=idle) communicated between the "base station" and all mobile stations participating in the simplex group communication ("mobile station No. 1" and "another mobile station") when the press button on the "mobile station No. 1" is not depressed and is in the OFF state, and the transmission right is not given to any mobile station.

If at this time the press button on the "mobile station No. 1" is depressed by the user to bring about the ON state, the "mobile station No. 1" conducts wireless transmission of a synchronous burst signal "SB2" to the "base station" to request acquisition of the transmission right. On the other hand, in the present example, it is supposed that the "mobile station No. 1" cannot receive a synchronous burst signal "SB3" to the effect that the transmission right is given, from the "base station" normally.

Thereupon, the "mobile station No. 1" emits a sound (transmission right acquisition failure sound) to inform the user that acquisition of the transmission right has failed, and the depression state of the press button depressed as described above is maintained, for example, mechanically or electrically.

Thereafter, in response to the maintained depression state of the press button, the "mobile station No. 1" conducts wireless transmission of the synchronous burst signal "SB2" to the "base station" again at timing when a predetermined time has elapsed, to request acquisition of the transmission right. If the "mobile station No. 1" normally receives the synchronous burst signal "SB3" to the effect that the transmission right is given, from the "base station" as an answer, the "mobile station No. 1" conducts wireless transmission of a synchronous burst signal "SB4" to the "base station" as an answer. As a result, the "base station" conducts wireless transmission of "RICH (F=communication, M=voice)" to the mobile stations (the "mobile station No. 1" and "another mobile station") to bring about the voice communication state.

Thereupon, the "mobile station No. 1" emits a sound (transmission right acquisition sound) to inform the user that the mobile station has acquired the transmission right, and the "mobile station No. 1" passes into a state in which the user can transmit voice. The "mobile station No. 1" conducts wireless transmission of voice input by, for example, the user via a microphone, to the "base station," and the wireless transmission of the voice from the "base station" to "another mobile station" participating in the simplex group communication is conducted.

Thereafter, the depressed state of the press button on the "mobile station No. 1" is stopped by, for example, the user or automatically, and the press button is released and brought into the OFF state. Thereupon, the "mobile station No. 1" conducts wireless transmission of a signal ("transmission right release") indicating that the transmission right is released, to the "base station." As a result, the "base station" conducts wireless transmission of "RICH (F=communication, M=idle)" to the mobile stations (the "mobile station No. 1" and "another mobile station") to bring about the access permission state.

Thus, even when the message exchange with the higher rank apparatus is not conducted normally, the mobile station P1-P8 in the present example can pass into the next transmission right acquisition operation while maintaining the depressed state of the press button.

Yet another embodiment will now be described with reference to FIG. 3.

Figure 3:
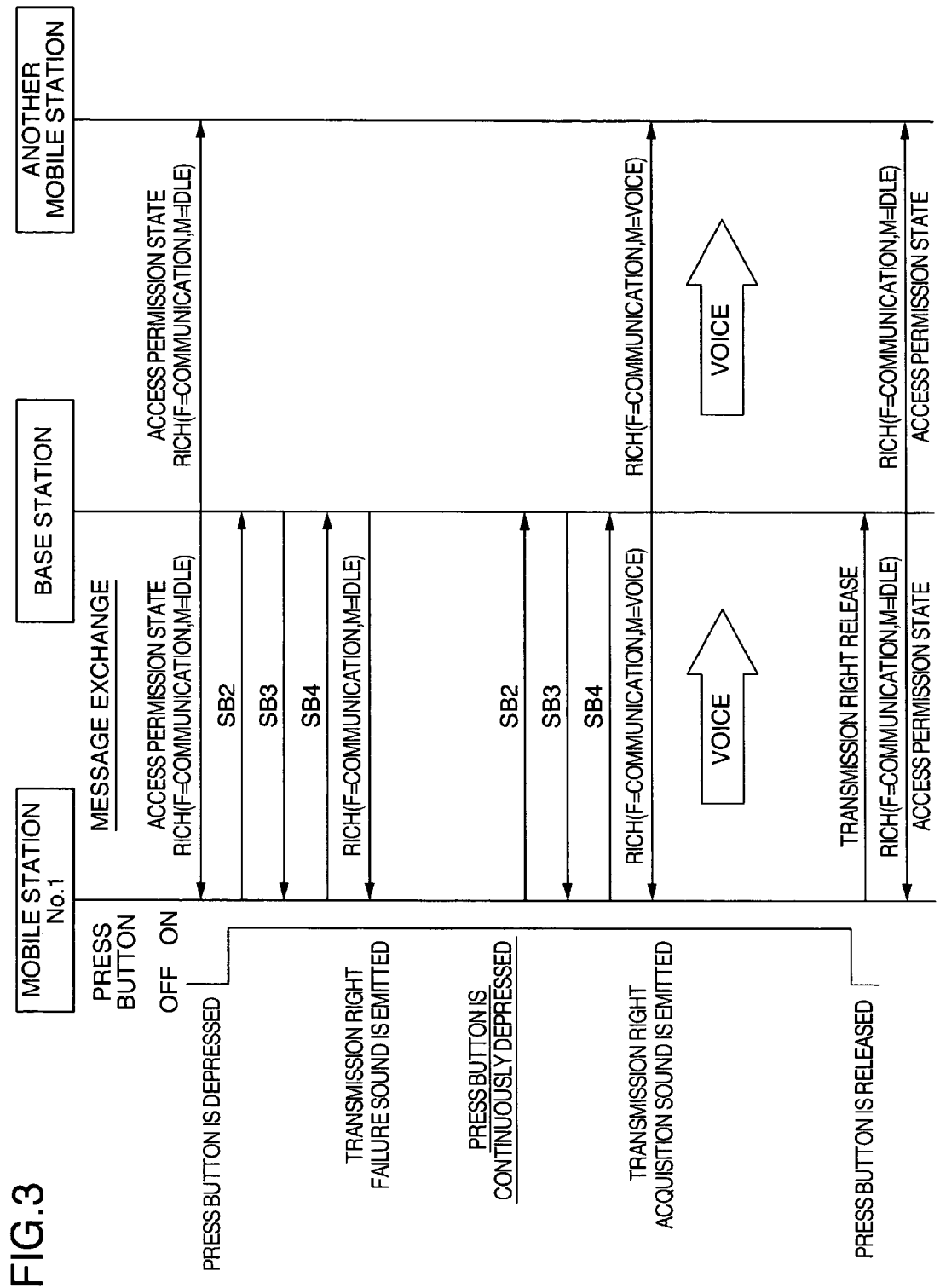
FIG. 3 is a diagram showing a procedure of processing in yet another embodiment of the present invention.

FIG. 3 shows an example of operation of the press button on the mobile station (mobile station No. 1) P1 and an example of a sequence of message exchange conducted between the mobile station P1 and the base station 1 serving as the higher rank apparatus.

In the present example, only portions that are different from the sequence shown in FIG. 2 will now be described in detail, and description of similar portions will be omitted or simplified.

The present example shows the case where the "mobile station No. 1" is refused once to acquire the transmission right by the "base station" serving as the higher rank apparatus by using the radio information channel (M=idle) and then a transmission right acquisition request is issued again and the transmission right is acquired.

Specifically, in the present example, the press button on the "mobile station No. 1" is depressed by the user to bring about the ON state. The "mobile station No. 1" conducts wireless transmission of a synchronous burst signal "SB2" to the "base station" to request acquisition of the transmission right. In this case, wireless transmission of the synchronous burst signal "SB3" to the effect that the transmission right is given, is conducted by the "base station." Wireless transmission of the synchronous burst signal "SB4" is conducted from the "mobile station No. 1" as an answer. Thereafter, however, wireless transmission of "RICH (F=communication, M=idle) is conducted by the "base station" to refuse to provide the transmission right. Thereupon, the "mobile station No. 1" emits a sound (transmission right acquisition failure sound) to inform the user that acquisition of the transmission right has failed, and the depression state of the press button depressed as described above is maintained, for example, mechanically or electrically.

Thus, even when the transmission right acquisition request is refused by the higher rank apparatus, the mobile station P1-P8 in the present example can pass into the next transmission right acquisition operation while maintaining the depressed state of the press button.

Still another embodiment of the present invention will now be described with reference to FIG. 4.

FIG. 4 shows an example of operation of the press button on the mobile station (mobile station No. 1) P1 and an example of a sequence of message exchange conducted between the mobile station P1 and the base station 1 serving as the higher rank apparatus.

In the present example, only portions that are different from the sequence shown in FIG. 2 will now be described in detail, and description of similar portions will be omitted or simplified.

The present example shows the case where the "mobile station No. 1" is refused once to acquire the transmission right by the "base station" serving as the higher rank apparatus in response to a transmission stop request and then a transmission right acquisition request is issued again and the transmission right is acquired.

By the way, the "transmission stop request" represents a signal of a radio management message (layer 3 signal). Such a "transmission stop request" can occur, for example, in the case where emergency communication that has occurred in another mobile station is given priority.

Specifically, in the present example, the press button on the "mobile station No. 1" is depressed by the user to bring about the ON state. The "mobile station No. 1" conducts wireless transmission of a synchronous burst signal "SB2" to the "base station" to request acquisition of the transmission right. In this case, wireless transmission of the synchronous burst signal "SB3" to the effect that the transmission right is given, is conducted by the "base station." Wireless transmission of the synchronous burst signal "SB4" is conducted from the "mobile station No. 1" as an answer. Wireless transmission of "RICH (F=communication, M=voice) is conducted by the "base station."Thereafter, however, wireless transmission of the "transmission stop request" is conducted by the "base station" to refuse to provide the transmission right. Thereupon, the "mobile station No. 1" emits a sound (transmission right acquisition failure sound) to inform the user that acquisition of the transmission right has failed, and the depression state of the press button depressed as described above is maintained, for example, mechanically or electrically.

Thus, even when the transmission right acquisition request is refused by the transmission stop request issued by the higher rank apparatus, the mobile station P1-P8 in the present example can pass into the next transmission right acquisition operation while maintaining the depressed state of the press button.

A further embodiment of the present embodiment will now be described with reference to FIG. 5.

FIG. 5 shows a concrete example in the case where patrol cars are used as the mobile stations P1 to P8.

FIG. 5 shows an example of operation of the press button on a "patrol car No. 1" and an example of a sequence of message exchange conducted between the "patrol car No. 1" and the base station 1 serving as the higher rank apparatus.

The sequence shown in FIG. 5 is roughly similar to that shown in FIG. 2. The "patrol car No. 1" is used as the "mobile station No. 1" conducting the simplex group communication, and "another patrol car" is used as "another mobile station" conducting the simplex group communication.

In the present example, only portions that are different from the sequence shown in FIG. 2 will now be described in detail, and description of similar portions will be omitted or simplified.

In the example shown in FIG. 5, the group communication is in an established state and several patrol cars are in a state in which they are drawn in the group communication (i.e., several patrol cars are in a state in which they participate in the group communication).

While the "patrol car No. 1" is traveling in a weak electric field area, the press button is depressed in the "patrol car No. 1" to execute the transmission right acquisition request to the "base station." Since the electric field is weak, however, reception of the synchronous burst signal "SB3" from the "base station" cannot be recognized normally. The transmission right acquisition failure sound is emitted. The transmission right acquisition request is executed again.

In the present example, the timer value of reception waiting between wireless transmission of the synchronous burst signal "SB2" from the "mobile station No. 1" to the "base station" conducted to request the transmission right acquisition and reception of the synchronous burst signal "SB3" to the effect that the transmission right is given is set equal to 400 msec. In other words, the "mobile station No. 1" counts elapsed time (timer) since the wireless transmission of the synchronous burst signal "SB2." If the synchronous burst signal "SB3" has not been received at the time of elapse of 400 msec, the "mobile station No. 1" regards it as timeout of reception waiting, and stops the reception wait state. In the normal state, the synchronous burst signal "SB3" can be received 120 msec to 160 msec after the wireless transmission of the synchronous burst signal "SB2." In the present example, therefore, the timer value is set equal to approximately twice the time.

In the present example, the maximum number of times of repeated execution of the transmission right acquisition request (transmission of the synchronous burst signal "SB2" in the present example) is set equal to 5. In other words, if the synchronous burst signal "SB3" is not received in the "mobile station No. 1" although the press button is depressed and the wireless transmission of the synchronous burst signal "SB2" is conducted, the transmission right acquisition request is re-executed up to five times at maximum. If the synchronous burst signal "SB3" is not received during five times, the "mobile station No. 1" brings the press button into the release state and stops execution of the transmission right acquisition request. Since talking is conducted typically while the patrol car is traveling, it takes approximately several seconds to get out of a temporary bad condition (such as weak electric field) area. In the present example, therefore, the above-described setting value is set.

In the present example, the interval between the repeated transmission right requests is set equal to, for example, 3,000 mS. In other words, the timer value of 3,000 ms is also set when the "mobile station No. 1" has transmitted the synchronous burst signal "SB2." If the "mobile station No. 1" has failed in the acquisition of the transmission right, the "mobile station No. 1" transmits the synchronous burst signal SB2 to the base station to repetitively request the transmission right acquisition each time 3,000 ms elapses.

A still further embodiment of the present invention will now be described with reference to FIG. 13.

The present embodiment is oriented for the case where the press button is depressed on the mobile station No. 1 to acquire the transmission right when all of carriers (for example, three carriers) that can be used for message communication are occupied by the mobile stations Nos. 2 to 4.

FIG. 13 shows an example of operation of the press button on the mobile station (mobile station No. 1) P1 and an example of a sequence of message exchange conducted between the mobile station P1 and the base station 1.

In FIG. 13, press-to-talk communication is being conducted between the base station and each of the mobile stations Nos. 2, 3 and 4 by using all available communication channels. Therefore, communication channels between the base station and the mobile stations Nos. 2, 3 and 4 are in the access nonpermission state, and the communication channel between the mobile station No. 1 and the base station is also in the access nonpermission state. If in this state the press button of the mobile station No. 1 is depressed by the user, wireless transmission of the synchronous burst signal SB2 from the mobile station No. 1 to the base station for requesting acquisition of the transmission right is not conducted and the mobile station No. 1 informs the user that it has failed in acquiring the transmission right by emitting the transmission right acquisition failure sound, and the depressed state of the press button is maintained. Therefore, wireless transmission of the synchronous burst signal SB3 to the effect that the transmission right is given is not wireless transmitted.

If, thereafter, the depression of the press button is maintained and the mobile station No. 2 for example stops its communication and releases the transmission right, wireless transmission of the RICH (F=communication, M=idle) to the mobile stations No. 1 and 2 is conducted by the base station. On the other hand, if, thereafter, the depression of the press button is not maintained, the request for acquisition of the transmission right is not made.

Even if the mobile station P1-P8 in the present example fails in acquisition of the transmission right because all radio channels available to communication are in the busy state, the mobile station P1-P8 can thus wait for release of the transmission right of some radio channel and pass into the next transmission right acquisition operation while maintaining the depressed state of the press button.

An example of the structure of a mobile station will now be described. In particular, a configuration example of operation switches such as the press button provided on the mobile station P1-P8 and an example of display output contents on a display screen provided on the mobile station P1-P8 will now be described.

First, a configuration example of operation switches provided on the mobile station P1-P8 will now be described.

Each mobile station P1-P8 includes an operation switch (continuously depressed switch) for executing the transmission right acquisition request two or more times at the maximum. Each mobile station P1-P8 may include an operation switch (once depressed switch) for executing the transmission right acquisition request only once, integrally with or separately from the continuously depressed switch.

As an example, the continuously depressed switch and the once depressed switch can be formed as one body by using a press button switch having a mechanical stopper. In a specific example, an L-shaped press button is provided, and its I-shaped part is used like an ordinary press button. A projection part of L from the I-shaped part is used as a locking member, and a hole part mating with the locking member is formed in casing of the mobile station P1-P8. The user can depress the press button in a direction perpendicular to the casing. In addition, the press button is displaced in a horizontal direction with respect to the casing while being depressed. As a result, the locking member of the press button comes into the hole part of the casing, and the press button can be fixed in its depressed state.

If the user depresses the press button, then the press button is released from the depressed state by a spring function provided in the casing, and the transmission right acquisition request is executed only once in the mobile station P1-P8. If the user displaces the press button while depressing it and consequently the press button is fixed in the depressed state by the locking member, then continuous transmission right acquisition request processing is executed in the mobile station P1-P8 according to the set condition. As the continuous transmission right acquisition request processing, for example, processing shown in FIGS. 2 to 5 and FIG. 13 is executed.

As another example, it is possible to form the continuously depressed switch and the once depressed switch as one body, by using a press button switch having a function of electrically maintaining a state in which the switch is regarded as depressed. In a specific example, an I-shaped press button is provided and a state in which the press button is depressed only once (one click) and a state in which the press button is depressed consecutively twice (double-click) are discriminated.

If the user depresses the press button only once, the mobile station P1-P8 executes the transmission right acquisition request only once. If the user depresses the press button consecutively twice, the mobile station executes continuous transmission right acquisition request processing according to the preset condition.

As the continuously depressed switch and the once depressed switch, various switches may be used.

FIG. 14 shows an example of a structure of a mobile station using a two-step seesaw switch as a press button having a function of mechanically maintaining the state in which the switch is regarded as depressed. Owing to this switch, switching between the press-to-talk OFF state and the press-to-talk ON state can be conducted, and the press-to-talk ON state can be continued by throwing down the seesaw switch to the press-to-talk ON side.

In FIG. 14, reference numeral 430 denotes a mobile station, 370 a liquid crystal screen, 372 operation switches, 36 a microphone/speaker, 374 an emergency switch, and 376 a press-to-talk switch. The operation switches 372 are used to execute various operations on the mobile station 430. The emergency switch 374 is a switch depressed when executing communication having high priority. The press-to-talk switch 376 is formed of a two-step seesaw switch.

FIG. 15 is a diagram showing operation states of the press-to-talk switch 376. FIG. 15($a$) shows a state in which the seesaw switch 376 is depressed to the OFF state side. FIG. 15($b$) shows a state in which the seesaw switch 376 is depressed to the ON state side. By thus using the seesaw switch as the press-to-talk switch, the depressed state can be easily maintained without conducting complicated operation such as double click. By the way, the seesaw switch is not restricted to the two-step seesaw switch. For example, a three-step seesaw switch may be used. In this case, the neutral point is used as the OFF state. The transmission right acquisition request to be conducted only once is specified by throwing down the seesaw switch to one side, and the continuous transmission right acquisition request is specified by throwing down the seesaw switch to the other side. In this way, the once depressed switch and the continuously depressed switch can be formed as one body. It is a matter of course that the press-to-talk switch function, the once depressed switch function, and the continuous depressed switch function can be implemented in various forms (including the one-body structure and the separate body structure).

Examples of display output contents on the display screen provided on the mobile station P1-P8 will now be described with reference to FIGS. 6A to 6D. FIGS. 6A to 6D are diagrams showing display screen examples that display information concerning the transmission right acquisition status.

Figure 6A:
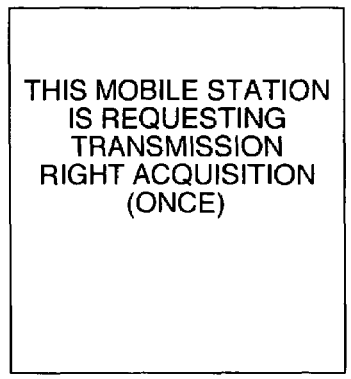
FIGS. 6A to 6D are diagrams respectively showing examples of screen display.

FIG. 6A shows an example of information contents displayed on the display screen of the mobile station P1-P8 when the once depressed switch is operated.

In the present example, a message to the effect that "this mobile station is requesting transmission right acquisition" and a message to the effect that the transmission right acquisition is requested only "once" are displayed. This view is displayed, for example, when "the press button is depressed" in FIG. 2.

Figure 6B:
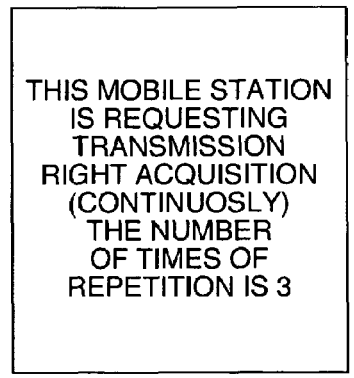

FIG. 6B shows an example of information contents displayed on the display screen of the mobile station P1-P8 when the continuously depressed switch is operated.

In the present example, a message to the effect that "this mobile station is requesting transmission right acquisition," a message to the effect that the transmission right acquisition is requested "continuously" unless the transmission right is obtained, "the number of times of repetition is 3" indicating the number of times of transmission right acquisition requests already executed or remaining number of times of transmission right acquisition requests that can be executed hereafter are displayed. This view is displayed, for example, when "the press button is continuously depressed" in FIG. 2.

Figure 6C:

FIG. 6C shows an example of information contents displayed on the display screen of the mobile station P1-P8 when the transmission right is acquired.

In the present example, a message "the transmission right is acquired" is displayed. This view is displayed, for example, when "the transmission right acquisition sound" is emitted in FIG. 2.

Figure 6D:
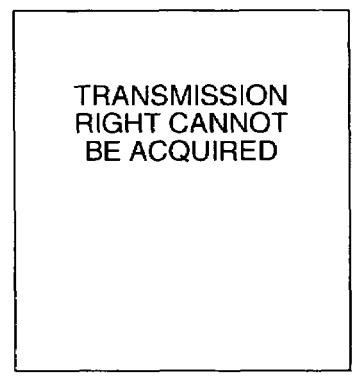

FIG. 6D shows an example of information contents displayed on the display screen of the mobile station P1-P8 when it has failed in acquisition of the transmission right.

In the present example, a message "the transmission right cannot be acquired" is displayed. This view is displayed, for example, when "the transmission right failure sound" is emitted in FIG. 2.

Various messages may be used as information contents displayed on the display screen of the mobile station P1-P8.

Figure 16:
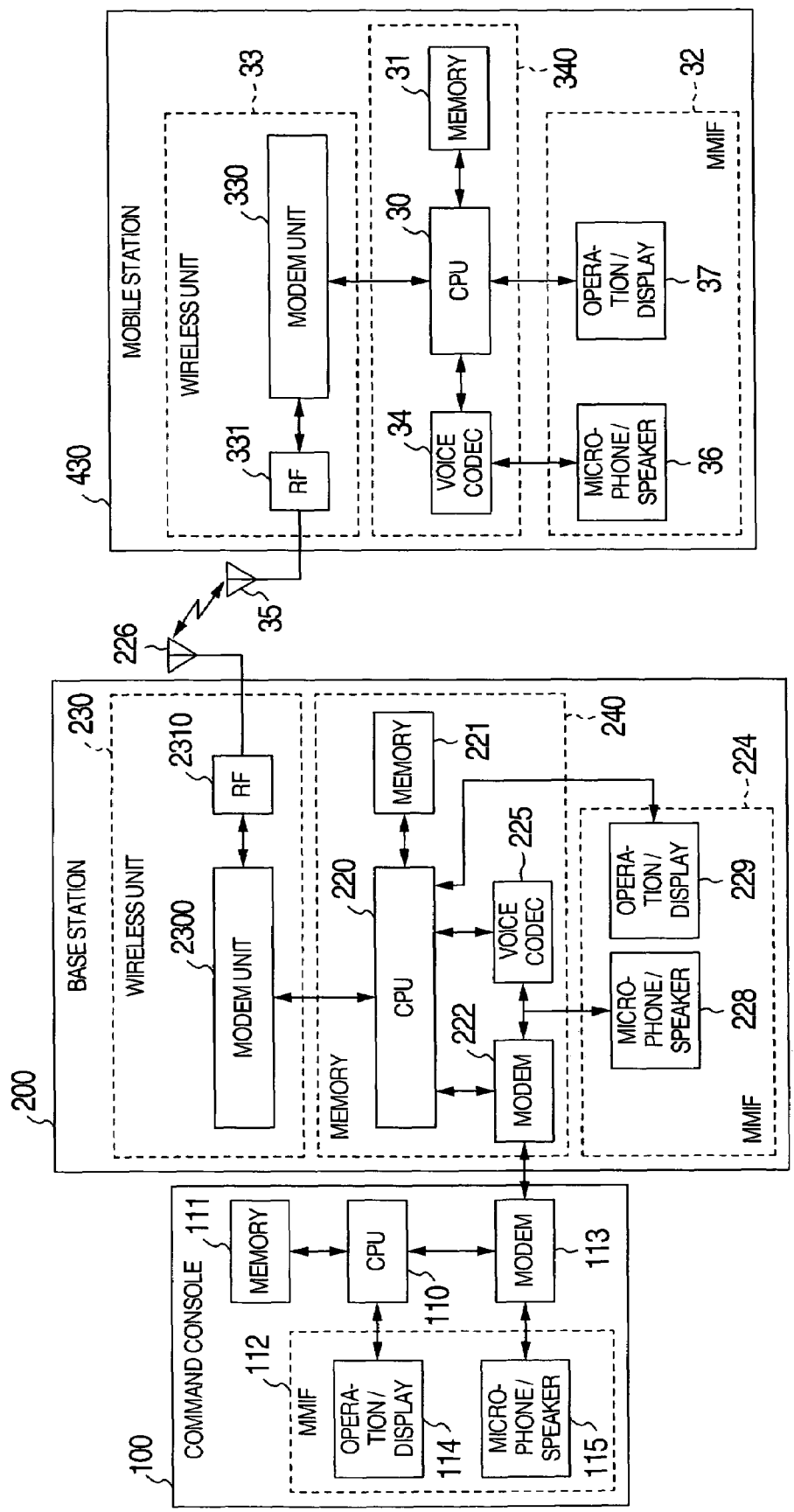
FIG. 16 is a block diagram showing a configuration of a mobile communication system in an embodiment of the present invention.

A mobile communication system according to an embodiment of the present invention will now be described with reference to FIG. 16. FIG. 16 shows an example of a hardware configuration of the mobile communication system.

In FIG. 16, reference numeral 100 denotes a command console, 200 a base station, and 430 a mobile station. In FIG. 16, only one mobile station is shown, and other mobile stations are omitted. As a matter of fact, however, a plurality of similar mobile stations exist in a communication region (base zone) of the base station 200, and outside the communication region in some cases.

First, the command console 100 will now be described.

The command console 100 includes a central processing unit (hereafter referred to as CPU) 110, a memory 111 connected to the CPU 110, a man-machine interface section (hereafter referred to as MMIF) 112, and a modem 113 connected to the CPU 110. The command console 100 is connected to the base station 200 via the modem 113 and by wire to exchange signals. Operation of the whole command console 100 is conducted by execution, in the CPU 110, of a program stored in the memory 111. An own number of the command console 100 and Nos. of mobile stations subordinate to the command console 100 are registered in the command console 100 to permit access from other command consoles, other base stations, and mobile stations that are not subordinate to the command console 100.

The MMIF 112 includes a microphone/speaker section 115 and an operation/display section 114. The microphone/speaker section 115 is connected to the modem 113. The operation/display section 114 is connected to the CPU 110.

The operation/display section 114 includes components operation keys, a display screen, and display lamps (not shown). The operation/display section 11 conducts setting of operation for the base station 200 and display of the state of the base station. When transmitting a message to the base station 200, a transmission start button (press button) that is included in the operation/display section 11 and that is not illustrated is thrown in. The CPU 110 transmits input information supplied from the operation/display section 114 and digital data corresponding to management information of the base station to the base station 200 via the modem 113. At this time, digital data is converted to a digital signal such as an MSK (Minimum Shift Keying) signal, and exchanged between the command console 100 and a modem in the base station 200. At the time of message transmission, i.e., when the press button is ON, a tone signal called press tone having a predetermined frequency and indicating that the command console is in the transmission state is transmitted onto a line so as to be superposed on a message. If the message is a voice at this time, the press tone is superposed on a voice signal and transmitted. If the message is nonvoice data such as a short message, the message is converted to a digital signal such as an MSK signal and the press tone is superposed on the digital signal and transmitted. When receiving a message from the base station, a tone called busy tone having a predetermined frequency is superposed on the message and transmitted from the base station. When the modem 113 has detected the busy tone, therefore, the message is output to the speaker if it is a voice and output to the display section via the CPU 110 if it is nonvoice data.

Hereafter, the base station will be described.

The base station 200 includes a radio section 230, a control section 240, a man-machine interface (MMIF) 224. The control section 240 includes a CPU 220, a memory 221, a modem 222 and a voice codec 225. Although the voice codec 225 is included in the control section 240 for convenience of description, it is not always necessary to do so. The base station 200 is connected to the command console 100 via the modem 222 and by wire to conduct signal exchange. The base station 200 is connected to the mobile station 430 via the antenna 226 and by radio to exchange signals. The radio section 230 includes a modem section 2300 connected to the CPU 220, and a radio frequency section 2310 connected between the modem section 2300 and the antenna 226. As the modulation system, the π/4 shift QPSK system or the like can be used.

Operation of the whole base station 200 is conducted by execution, in the CPU 220, of a program stored in the memory 221. The CPU 220 receives digital data transmitted from the command console 100 via the modem 222, and conducts operation setting of the base station 200 according to contents of the digital data. The CPU 220 transmits digital data from the base station 200 to the command console 100 via the modem 222. In the case where the message (voice data or nonvoice data) from the command console 100 is transmitted, the press tone is detected by the modem 222. If the message is voice, then the voice signal is coded to digital data by the voice codec 225, and the digital data is converted to a predetermined transmission data format by the CPU 220, modulated by the modem section 2300 in the radio section 230, and transmitted from the antenna 226 via the radio frequency section 2310. If the message is nonvoice data, then the message is converted to a predetermined transmission data format by the CPU 220, modulated by the modem section 2300 in the same way, and transmitted from the antenna 226 via the radio frequency section 2310. In the case where voice is input from the microphone/speaker section 228 in the base station 200 and transmitted to the mobile station 430, a transmission start button (press button) in the operation/display section 229 is thrown in, and voice is input, coded by the voice codec 225, and transmitted according to a procedure similar to the above-described procedure.

As for an identifier (ID) of a mobile station described later and an information bit that indicates that a message is an important message to be transmitted to all mobile stations, the CPU 220 conducts formatting on them and adds a result to the message when rearranging data (when conducting conversion to the transmission data format).

When the base station 200 has received a radio signal from the mobile station 430 via the antenna 226, the signal is demodulated by the demodulation section 2300 in the radio section 230 and the message is reproduced by the CPU 220. In the case where the received message is voice data, the voice codec 225 decodes the voice data, reproduces voice, outputs the reproduced voice to the command console 100, and outputs the voice to the speaker 228 in the base station as well. If the received message is nonvoice data, the data is output to the command console 100 via the modem 222.

The mobile station 430 will now be described.

The mobile station 430 includes a CPU 30, a memory 31 connected to the CPU 30, a man-machine interface (MMIF) 32 connected to the CPU 30, a radio section 33 connected to the CPU 30, a voice coded 34 connected to the CPU 30, and an antenna 35 connected to the radio section 33. The mobile station 430 is connected to the base station 200 via the antenna 35 and by radio to exchange messages. The CPU 30, the memory 31 and the voice codec 34 constitute a control section 340. Operation of the whole mobile station including the operation described with reference to FIGS. 2 to 5 and 13 is conducted by execution, in the CPU 30, of a program stored in the memory 31. Although the voice codec 34 is included in the control section 340 for convenience of description, it is not always necessary to do so. The radio section 33 includes a modem section 330 connected to the CPU 30, and a radio frequency section 331 connected between the modem section 330 and the antenna 35. The MMIF 32 includes a microphone/speaker section 36 and an operation/display section 37. The operation/display section 37 includes components such as the operation keys and the liquid crystal display screen shown in FIG. 14. The microphone/speaker section 36 is connected to the voice codec 34, and the operation/display section 37 is connected to the CPU 30. The CPU 30 executes the program stored in the memory 31 to control the operation of the whole mobile station.

When a radio signal is received, the modem section 330 in the radio section 33 demodulates the radio signal and then the CPU 30 reproduces the message. If the received message is voice data, the voice codec 34 decodes the voice data, reproduces the voice, and outputs the voice to the speaker 36. If the received message is digital data, the CPU 30 outputs the digital data to the operation/display section 37. When transmitting a message by radio, the press-to-talk switch (transmission start button) 376 shown in FIG. 14 of the operation section 37 is thrown in. Voice input from the microphone 36 is decoded into digital data by the voice codec 34, and then the digital data is converted to a predetermined transmission data format for radio transmission, modulated by the modem section 330 in the radio section 33, and transmitted from the antenna 35. When transmitting digital data such as a short message (for example, when inputting a number code from the operation/display section and transmitting the number code), the message information is converted to a predetermined transmission data format, then modulated by the modulation section 330 in the radio section 33, and transmitted from the antenna 35. By the way, communication mode switching is possible between a base dependence mode (communication via the base station) and a direct communication mode (direct communication between mobile stations). This switching is conducted by using the operation switch 372 or the like, and the CPU 30 changes over the carrier in the radio section 33. Furthermore, the CPU 30 determines whether an identifier (ID) that specifies a specific mobile station and an information bit that indicates an attribute of a message has been added to the message received from the base station. If the message has an identifier specifying the own station added thereto and the information bit indicates that the received message is an important message to be transmitted to all mobile stations, the CPU 30 changes the communication mode over to the direct communication mode and exercises control so as to transmit the important message by using a carrier for direct communication. As a result, it becomes possible for another mobile station placed in the direct communication mode to receive an important message. After the important message is transmitted by using the direct communication carrier and the communication mode is restored to the base dependence mode by the operator, the CPU 30 further sets the information bit to "answer" data, sets the ID to the number of the own station, and exercises control to conduct transmission by using an up-link carrier. As a result, it becomes possible for the base station to confirm that processing required for simultaneous emergency informing operation for all mobile stations has been executed. The mobile station that has received the important message in the direct communication mode may set the information bit to "answer" data, set the ID to the number of the own station, and inform the mobile station of the transmission source in the direct communication mode that the important message has been received. This control is exercised by the CPU 30.

According to the wireless communication system according to the present invention, in the configuration in which wireless communication is conducted between the base station and the mobile station, the mobile station is adapted to execute a request (transmission right acquisition request) for acquiring the transmission right, in response to acceptance of an order issued by, for example, a user to execute the request for acquiring the transmission right. If the mobile station has failed in acquiring the transmission right by executing the request, the mobile station is adapted to execute the request for acquiring the transmission right again, as heretofore described. For example, therefore, the transmission right acquisition operation such as press button depressing operation conducted by the user of the mobile station can be simplified, resulting in improved user convenience in use.

Here, the configurations of the wireless communication system, the base station and the mobile station according to the present invention are not necessarily restricted to those described above, but various configurations may be used. Furthermore, it is also possible to provide the present invention as, for example, a method or system for executing processing according to the present invention, a program for implementing such a method or system, or a recording medium for recording the program. It is also possible to provide the present invention as various apparatuses or systems.

Furthermore, the application fields of the present invention are not necessarily restricted to those heretofore described, but the present invention can be applied to various fields.

As for various kinds of processing conducted in the wireless communication system, the base station and the mobile station according to the present invention, a configuration in which a processor executes a control program stored in a ROM (Read Only Memory) to exercise control in, for example, hardware resources including the processor and a memory may also be used. Furthermore, for example, respective function means for executing the processing may also be formed as independent hardware circuits.

The present invention can also be implemented as a recording medium such as a floppy (trade mark) disk, CD (Compact Disc), or a ROM that stores the control program and that can be read by a computer, or as the control program (itself). Processing according to the present invention can be performed by inputting the control program from the recording medium to a computer and making the computer execute the control program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system, comprising:
   a base station; and
   a plurality of mobile stations capable of conducting wireless communication with said base station by using a simplex system,
   each of the mobile stations comprising:
   order accepting means for accepting an order to execute a request for acquiring a transmission right one time or an order to execute a request for acquiring a transmission right a plurality of times;
   request execution means, responsive to acceptance of an order for execution by the order accepting means, for executing said request for acquiring the transmission right, said request execution means being adapted to execute, when the request is to be made a plurality of times, the request for acquiring the transmission right up to a predetermined number of times such that the request for acquiring the transmission right is again executed when acquisition of the transmission right by execution of the request has failed; and information output means for outputting different information depending upon different conditions including:
(a) outputting, when executing a request for acquiring the transmission right one time, information which indicates that said request is made one time,
(b) outputting, when executing a request for acquiring the transmission right a plurality of times, information which indicates how many times said request has been made,
(c) outputting, when the transmission right is acquired, information indicating the acquisition of the transmission right, and
(d) outputting, when acquisition of the transmission right has failed, information indicating that the acquisition of the transmission right has failed.

2. The wireless system according to claim 1, wherein each of the mobile stations further comprises:
a status information output section to provide the operator with information concerning a status of acquisition of the transmission right.

3. The wireless system according to claim 2, wherein the execution of the request for acquiring the transmission right in said control section in each of the mobile stations comprises:
conducting wireless transmission of a request signal for acquiring the transmission right to said base station,
upon receiving the request signal from any of the mobile stations, said base station is adapted to conduct wireless transmission of a transmission right giving signal to the mobile station,
upon receiving the transmission right giving signal from said base station, said control section in the mobile station is adapted to conduct wireless transmission of a transmission right giving answer signal to said base station,
upon receiving the transmission right giving answer signal, said base station is adapted to set a radio information channel on a physical radio channel, and
wherein said status information output section in the mobile station provides the operator with information of a transmission right acquisition status.

4. The wireless system according to claim 3, wherein if the transmission right giving signal is not received from said base station within a predetermined time after the wireless transmission of the request signal to said base station, said control section in the mobile station is adapted to conduct wireless transmission of the request signal for acquiring the transmission right to said base station again, and
wherein said control section in the mobile station is adapted to conduct re-execution of the request for acquiring the transmission right up to a predetermined number of times at maximum, in response to an order issued by the operator once and accepted by said order accepting section.

5. A mobile station which conducts wireless communication, comprising:
order accepting means for accepting an order to execute a request for acquiring a transmission right one time or an order to execute a request for acquiring a transmission right a plurality of times;

request execution means, responsive to acceptance of an order for execution by the order accepting means, for executing said request for acquiring the transmission right, said request execution means being adapted to execute, when the request is to be made a plurality of times, the request for acquiring the transmission right up to a predetermined number of times such that the request for acquiring the transmission right is again executed when acquisition of the transmission right by execution of the request has failed; and information output means for outputting different information depending upon different conditions including:
(a) outputting, when executing a request for acquiring the transmission right one time, information which indicates that said request is made one time,
(b) outputting, when executing a request for acquiring the transmission right a plurality of times, information which indicates how many times said request has been made,
(c) outputting, when the transmission right is acquired, information indicating the acquisition of the transmission right, and
(d) outputting, when acquisition of the transmission right has failed, information indicating that the acquisition of the transmission right has failed.

6. The mobile station according to claim 5, wherein said order accepting section comprises:
a once execution order accepting section to accept an order that specifies once request execution as an order of execution of a request for acquiring the transmission right; and
a continuous execution order accepting section to accept an order that specifies continuous request execution as an order of execution of a request for acquiring the transmission right, and
if an order is accepted by said once execution order accepting section, said control section is adapted to execute a request for acquiring the transmission right only once, and
if an order is accepted by said continuous execution order accepting section, said control section is adapted to execute a request for acquiring the transmission right at least twice except when the transmission right is acquired by executing the request for acquiring the transmission right only once.

7. A wireless communication method in a wireless communication system including a base station, and a plurality of mobile stations capable of conducting wireless communication with said base station by using a simplex system, the wireless communication method comprising the steps of:
executing a request for acquiring a transmission right in one of the mobile stations including:
accepting an order to execute a request for acquiring a transmission right one time or an order to execute a request for acquiring a transmission right a plurality of times;
responsive to acceptance of an order for execution, executing said request for acquiring the transmission right including executing, when the request is to be made a plurality of times, the request for acquiring the transmission right up to a predetermined number of times such that the request for acquiring the transmission right is again executed when acquisition of the transmission right by execution of the request has failed; and outputting different information depending upon different conditions including:
(a) outputting, when executing a request for acquiring the transmission right one time, information which indicates that said request is made one time,
(b) outputting, when executing a request for acquiring the transmission right a plurality of times, information which indicates how many times said request has been made,
(c) outputting, when the transmission right is acquired, information indicating the acquisition of the transmission right, and
(d) outputting, when acquisition of the transmission right has failed, information indicating that the acquisition of the transmission right has failed.

8. The wireless communication method according to claim 7, further comprising the step of:
providing the operator with information concerning a situation of acquisition of the transmission right.

9. The wireless communication method according to claim 8, wherein the step of executing a request for acquiring the transmission right in the mobile station further comprises:
conducting wireless transmission of a request signal for acquiring the transmission right to said base station,
upon receiving the request signal from the mobile station, said base station conducts wireless transmission of a transmission right giving signal to the mobile station,
conducting wireless transmission of a transmission right giving answer signal to said base station upon receiving the transmission right giving signal from said base station, and
upon receiving the transmission right giving answer signal, said base station sets a radio information channel on a physical radio channel.

10. The wireless communication method according to claim 9, further comprising the step of:
conducting wireless transmission of the request signal for acquiring the transmission right to said base station again if the transmission right giving signal is not received from said base station within a predetermined time after the wireless transmission of the request signal to said base station,
wherein the step is repeated up to a predetermined number of times at maximum, in response to an order issued by the operator once and accepted by said order accepting section.

11. A computer program stored on a storage medium for executing wireless communication in a wireless communication system including a base station and a plurality of mobile stations, said computer program, when executed, causes the wireless communication system to perform the steps of:
executing a request for acquiring a transmission right in one of the mobile stations including:
accepting an order to execute a request for acquiring a transmission right one time or an order to execute a request for acquiring a transmission right a plurality of times;
responsive to acceptance of an order for execution, executing said request for acquiring the transmission right including executing, when the request is to be made a plurality of times, the request for acquiring the transmission right up to a predetermined number of times such that the request for acquiring the transmission right is again executed when acquisition of the transmission right by execution of the request has failed; and
outputting different information depending upon different conditions including:
(a) outputting, when executing a request for acquiring the transmission right one time, information which indicates that said request is made one time,
(b) outputting, when executing a request for acquiring the transmission right a plurality of times, information which indicates how many times said request has been made,
(c) outputting, when the transmission right is acquired, information indicating the acquisition of the transmission right, and
(d) outputting, when acquisition of the transmission right has failed, information indicating that the acquisition of the transmission right has failed.

* * * * *